US012386832B1

(12) United States Patent
Glasbergen et al.

(10) Patent No.: US 12,386,832 B1
(45) Date of Patent: Aug. 12, 2025

(54) SYNTHETIC DATA GENERATION FOR QUERY PLANS

(71) Applicant: Salesforce, Inc., San Francisco, CA (US)

(72) Inventors: Bradley Glasbergen, Squamish (CA); Yen-Li Laih, Bellevue, WA (US); Yi Xia, Los Angeles, CA (US); Colm McHugh, Dublin (IE); Prateek Swamy, Livermore, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/423,725

(22) Filed: Jan. 26, 2024

(51) Int. Cl.
  *G06F 16/00* (2019.01)
  *G06F 16/2453* (2019.01)
  *G06N 7/01* (2023.01)

(52) U.S. Cl.
  CPC .. *G06F 16/24542* (2019.01); *G06F 16/24537* (2019.01); *G06N 7/01* (2023.01)

(58) Field of Classification Search
  CPC .............. G06F 11/3409; G06F 16/217; G06F 16/24542; G06F 16/2462; G06F 16/2465; G06F 17/11; G06F 17/18; G06F 18/2185; G06F 2209/5019; G06F 40/284; G06F 40/30; G06F 40/40; G06F 8/10; G06F 9/4451; G06F 9/451; G06F 16/24544; G06F 16/2423; G06F 16/2428; G06F 16/2453; G06F 16/24534; G06F 16/2454; G06F 21/6227; G06F 16/211; G06F 16/2246; G06F 16/256; G06F 3/0604; G06F 3/061; G06F 3/0631; G06F 3/067; G06F 3/0685; G06F 9/505
  See application file for complete search history.

(56) References Cited

U.S. PATENT DOCUMENTS

| | | | |
|---|---|---|---|
| 2018/0181624 A1* | 6/2018 | Koch .................. | G06F 16/2462 |
| 2018/0218038 A1* | 8/2018 | Katahira ........... | G06F 16/24542 |
| 2022/0129709 A1* | 4/2022 | Canal ..................... | G06F 17/11 |
| 2023/0135823 A1 | 5/2023 | Zhang et al. | |
| 2023/0205760 A1 | 6/2023 | McHugh et al. | |
| 2024/0418515 A1* | 12/2024 | Wu .......................... | G06N 3/08 |

* cited by examiner

*Primary Examiner* — Shyue Jiunn Hwa
(74) *Attorney, Agent, or Firm* — Kowert, Hood, Munyon, Rankin & Goetzel, P.C.; Catherine L. Gerhardt; Dean M. Munyon

(57) ABSTRACT

Techniques are disclosed relating to database query optimizers. In some embodiments, a system receives, from a query optimizer, a plurality of query plans for a database maintained by the database system. The system retrieves a set of database statistics for the database and generates, via a data synthesizer, a plurality of synthetic datasets, where generating a given synthetic dataset is performed based on a given query plan of the plurality of query plans and the set of database statistics, and includes generating a plurality of synthetic data tuples. The system executes the plurality of query plans on the plurality of synthetic datasets and updates the query optimizer based on results of executing the plurality of query plans on the plurality of synthetic datasets. The disclosed data synthesis may advantageously improve query performance due to more efficient query plans being selected for execution of requested queries.

20 Claims, 12 Drawing Sheets

US 12,386,832 B1

SYNTHETIC DATA GENERATION FOR QUERY PLANS

BACKGROUND

Technical Field

This disclosure relates generally to database systems, and, more specifically, to database query optimizers.

Description of the Related Art

When a query is submitted to a database, it may express what the result of a query should be, but not how to obtain the result. As such, it may be possible to execute a query using several different approaches. For example, a query requesting a join of tables A, B, and C may be executed as 1) a join of A and B followed by a join of the result and C or 2) a join of B and C followed by a join of A and the result. Modern relational database systems typically employ a query optimizer that receives a parsed query and evaluates different query execution plans to determine a plan for executing a query on the database. This evaluation may include determining scores for each plan based on estimated computational and storage costs and selecting the plan with the best score. Accordingly, a query optimizer might provide a better score to the second plan noted above if the result of joining B and C produced a smaller temporary table than the result of joining A and B.

DETAILED DESCRIPTION

Figure 1:
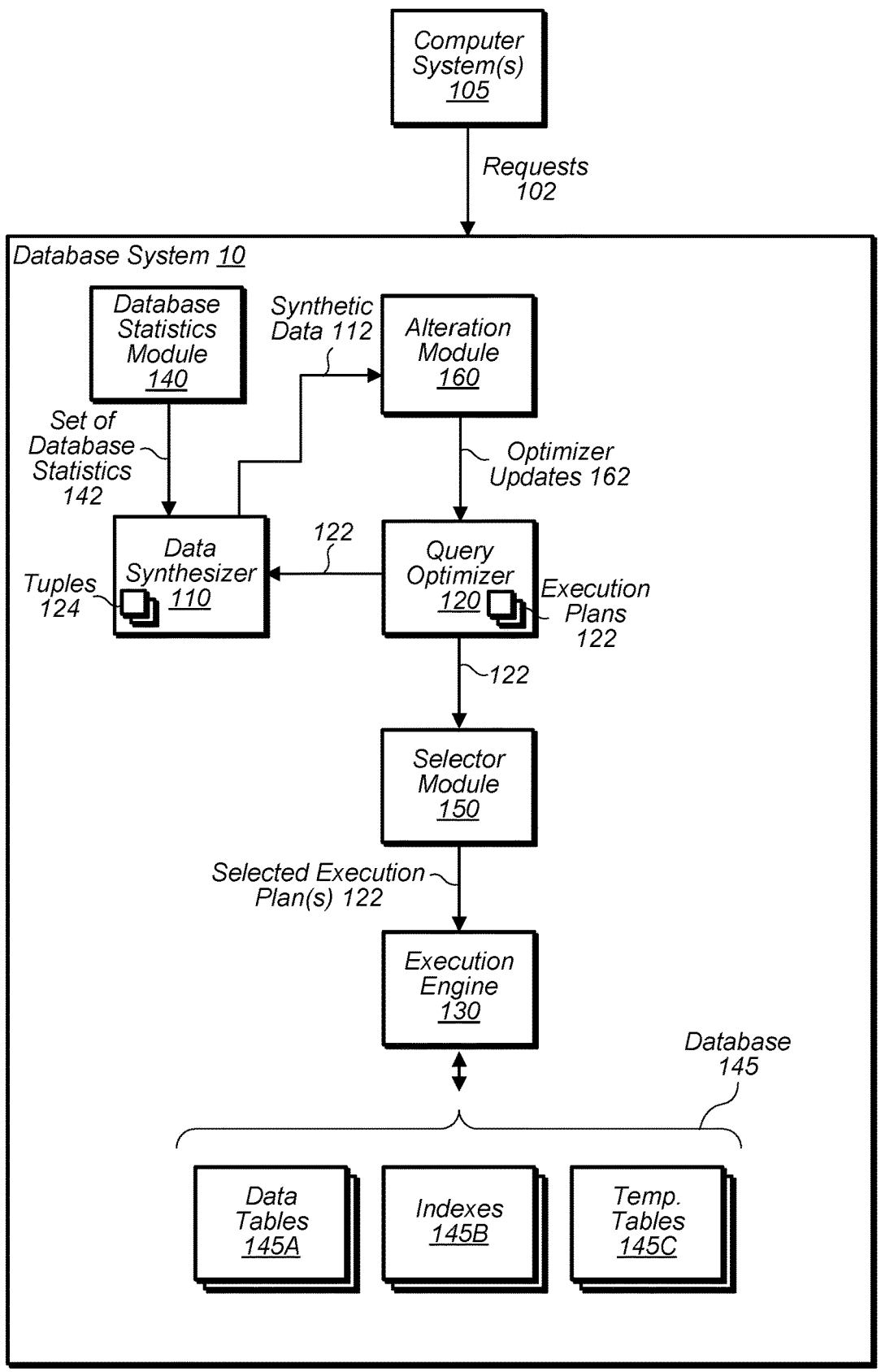
FIG. 1 is a block diagram illustrating a database system configured to support query plan optimization, according to some embodiments.

In general, database systems (e.g., Salesforce.com™) may store a vast amount of customer data that is private. Thus, the developers of such database systems do not have visibility to the data in order to maintain privacy, for example. On a running system in the cloud, however, developers do have visibility into the generated query plans and the selectivities associated with each part of the query plan. As such, it may be difficult for developers to ascertain whether a query optimizer operated by the underlying database has generated an optimal query plan. Further, query optimizers may not always select a most desirable execution plan for a given query because of various difficulties with the statistics and the skew on actual data stored in the underlying tables.

The disclosed techniques attempt to determine whether an optimal query plan was generated by the query optimizer for queries on private data, without the ability to view the underlying data itself. For example, given a query plan P, that includes some set of criteria, the disclosed techniques attempt to generate a dataset D for which the query plan P returns approximately the same number of rows as its corresponding database statistics estimate for each stage of the query plan. To accomplish this goal, the disclosed techniques include a data generator that generates synthetic data for use in testing query plans. Said another way, the disclosed techniques implement a method for empirically determining optimal query plans for a database by generating synthetic data based on the query plans themselves and statistics for data currently stored in a database. While the disclosed database system may not have visibility to the data itself, the system has access to database statistics summarizing the data stored in the database.

The goal of generating synthetic datasets is to identify which of our generated query plans performs the best (i.e., which query plans to use in production). The disclosed data generator outputs different sets of synthetic data by applying generated query plans based on database statistics. As such, instead of querying synthetic data using query plans in order to test the efficiency of the query plans, the disclosed techniques generate synthetic data by evaluating the probabilities of multiple different query criteria for a given query plan based on statistics to generate synthetic data to match or closely resemble real-world data stored across various database instances. If the synthetic data follows a distribution similar to the distribution of data indicated by the statistics, then the query plan used to generate the synthetic data is likely to perform well on the underlying real-world data corresponding to the canned statistics. Said another way, if a query plan performs well on the set of synthetic data, generated according to a given query plan, that closely matches the database statistics (which were generated from real-world data), then the query plan is considered efficient. As used herein, the term "canned statistic" is intended to be construed according to its well-understood meaning, including a number of rows that a particular stage of a query plan is expected to return for a given real-world dataset (as opposed to a synthetic dataset such as those generated via the disclosed techniques). The synthetic datasets generated using the disclosed techniques are made up of (e.g., millions) of tuples. As used herein, the term "data tuple" is intended to be construed according to its well-known meaning, which includes a single row of data in an underlying database.

In disclosed techniques, both the query plans and the canned statistics may be varied to achieve different sets of synthetic data. For example, the disclosed synthetic data generator makes slight adjustments to canned statistics while generating different sets of synthetic data, to observe whether the query plan performs well on stored datasets that have different sets of characteristics. This indicates how a query plan will perform across different data distributions. For example, if a given query plan performs well overall, the disclosed techniques will select this query plan over a query plan that performs well for one data distribution (i.e., spikes in performance) but is slow or performs poorly for others. In addition, the disclosed techniques may advantageously generate multiple different synthetic datasets simultaneously. Simultaneous generation is more efficient than if each individual synthetic dataset were to be generated sequentially. For example, the disclosed techniques might generate five or six different synthetic datasets at one time rather than generating a single synthetic dataset at one time. The simultaneous generation of synthetic datasets may advantageously be more computationally efficient as well as less time-intensive than sequential data generation, for example.

Query Plan Selection

Turning now to FIG. 1, a block diagram of a database system 10 configured to support query plan optimization is depicted. In illustrated embodiment, database system 10 includes query optimizer 120, database statistics module 140, data synthesizer 110, selector module 150, execution engine 130, alteration module 160, and database 145. In the illustrated embodiment, database system 10 receives requests 102 (which may also be referred to as "queries") from one or more computer systems 105. In some embodiments, database system 10 may be implemented differently than shown. For example, system 10 may include more components, queries 102 may be expressed using any of various syntax, data synthesizer 110 may include entire synthetic datasets made up of tuples 124, data synthesizer 110 may be executed separately from database system 10 (e.g., by another system) and may provide synthetic data 112 to database system 10 for input to alteration module 160, etc.

Database system 10 may correspond to any suitable database system. In some embodiments, system 10 is a relational database management system (RDBMS), which may be implemented using, for example, Oracle™, MySQL™, Microsoft™ SQL Server, PostgreSQL™, IBM™ DB2, etc. Accordingly, system 10 may be configured to store data in one or more data tables 145A for servicing queries 102. Further, system 10 may implement a database that is a distributed database have multiple distributed instances. System 10 may also maintain one or more indexes 145B usable to facilitate retrieving data from data tables 145A, and may generate one or more temporary tables 145C in response to servicing queries 102. In some embodiments, queries 102 are expressed using structured query language (SQL); in other embodiments, other query declarative languages may be supported. In some embodiments, database system 10 includes a multi-tenant database in which multiple tenants each store a respective set of data in the database, as discussed in further detail below with reference to FIG. 10. For example, the multi-tenant database may include a first set of data belonging to a non-profit organization (e.g., a first tenant) and a second set of data belonging to a company (e.g., a second tenant). In such an embodiment, database system 10 may employ various security measures to ensure that one tenant's dataset is isolated from another's dataset in order to prevent one tenant from accessing another tenant's data.

Query optimizer 120, in various embodiments, is operable to generate an execution plan 122 for a given query 102, which includes evaluating various execution plans 122 and selecting one to implement the given query 102. Query optimizer 120 may use any suitable algorithm to evaluate and select plans 122. In some embodiments, query optimizer 120 may use a heuristic algorithm in which execution plans 122 are assessed based on a set of rules provided to optimizer 120. In other embodiments, optimizer 120 uses a cost-based algorithm in which optimizer 120 performs a cost analysis that includes assigning scores to execution plans 122 based on an estimated processor consumption, an estimated memory consumption, an estimated execution time, etc. These estimates may further be based on various metrics such as the number of distinct values in table columns, the selectivity of predicates (the fraction of rows the predicate would qualify), the cardinalities (e.g., row counts) of tables 140A being accessed, etc. Based on the scores, query optimizer 120 may then select an execution plan 122 that has the best score. In some embodiments, query optimizer 120 is modified by one or more developers offline to adjust how the optimizer determines costs and scores for different query plans based on synthetic data generated by data synthesizer 110, as discussed in further detail below.

In some embodiments, query optimizer 120 works in combination with selector module 150 to select a query execution plan for a given query 102. For example, query optimizer 120 may send execution plans 122 and scores for the respective plans to selector module 150. Selector module 150, as discussed in further detail below, selects a query plan based on the scores generated by query optimizer 120 for the different execution plans 122. In various embodiments, query optimizer 120 generates a set of query plans for a given query 102 and then selects a subset of the set of query plans (based on scoring the plans) and send this subset to selector module 150. In such embodiments, selector module 150, as discussed further below, selects one or more of the subset of the set of query plans, for execution by execution engine 130. In some embodiments, query optimizer 120 or selector module 150 may use a combination of heuristic and cost-based algorithms.

As discussed above, in various embodiments, query optimizer 120 (or selector module 150) is further operable to evaluate execution plans 122 based on constraints (also referred to herein as query "criteria") included in a query 102 and select plans 122 that comply with the constraints. For example, in some embodiments, query optimizer 120 may assign an unfavorable score to (or may not even score) any execution plan 122 that does not comply with the query constraints in order to preclude it from being selected.

In various embodiments, if query optimizer 120 is unable to select an execution plan 122 that satisfies the constraints for a given query 102, query optimizer 120 is operable to provide a corresponding indication specifying than an error has occurred. In some embodiments, this error may indicate not only that a plan 122 does not exist to satisfy constraints, but also identify the particular constraint that could not be satisfied if multiple constraints were specified in the query 102. In some embodiments, query optimizer 120 may still select an execution plan 122 (albeit one that does not comply with constraints) and provide it to plan execution engine 130 (or selector module 150)—thus, a user may still receive results of the query, but be made aware that the results were obtained in a manner that is inconsistent with the provided constraints. In other embodiments, however, query optimizer 120 may provide an error and not select any plan 122 to implement the query 102.

Database statistics module 140, in the illustrated embodiment, generates a set 142 of database statistics for database 145. In various embodiments, the set 142 of database statistics summarizes the types, amounts, organization, etc. of data stored in the database. In other embodiments, database statistics module 140 receives the set 142 of database statistics from another system (other than database system 10). In the illustrated embodiment, database statistics module 140 inputs the set 142 of database statistics to data synthesizer 110. In various embodiments, set 142 of database statistics generated by module 140 are generated based on broad statistics for database 145. In some situations, however, database statistics module 140 may only select a subset of relevant statistics from the broad for use in generating synthetic data for query plans. As one specific example, module 140 may generate fixed (i.e., "canned") statistics for Salesforce multi-tenant databases. Multi-tenant databases store data for multiple tenants within a single database instances There may be many multi-tenant database instances within a particular geographic region, as discussed in further detail below with reference to FIG. 10. In this specific example, a given geographical region running multiple databases for multiple different tenants store different data for each tenant (e.g., one tenant in the given region might have 100 customers, another 1000 customers, and so forth within the same instance of the database). Each of these tenants may share the same set of database statistics, despite having distinct underlying data.

In some situations, the database statistics differ from true statistics for the stored data for a given customer or tenant. These differences may arise because the statistics are approximate, because the statistics are stale (i.e.,. not recently updated), or because a database is using fixed ("canned") statistics across tenants and database instances. Accordingly, when selector module 150 evaluates query plans based on its stored statistics, it may select a poorly performing plan because the considered statistics differ from the true distribution values. Therefore, a synthetic data generator is used to create multiple datasets that correspond to plausible data distributions based on database statistics and query plans, incorporating the understanding that "true statistics" may differ from the stored versions. The disclosed techniques attempt to generate query plans that return a number of rows that matches known statistics that indicate an expected number of rows to be returned for a corresponding "real-world" dataset.

Data synthesizer 110, in the illustrated embodiment, receives execution plans 122 and set 142 of database statistics from query optimizer 120 and database statistics module 140, respectively. Data synthesizer 110, in the illustrated embodiment, generates synthetic data 112 based on both the execution plans 122 and set 142 of database statistics. For example, data synthesizer 110 generates probability models, based on set 142 of database statistics for each execution plan 122. In this example, data synthesizer 110 executes the probability models to generate synthetic data tuples 124 for each execution plan 122. Each execution of a given probability model produces a synthetic data tuple for an execution plan 122 corresponding to the given probability model. In various embodiments, synthetic data 112 includes a plurality of different synthetic datasets made up of data tuples 124 as discussed in further detail below with reference to FIGS. 2A-8. Data synthesizer 110, in the illustrated embodiment, provides synthetic data 112 to alteration module 160.

Alteration module 160, in the illustrated embodiment, receives synthetic data 112 from data synthesizer 110. Alteration module 160 also receives execution plans 122 either from data synthesizer 110 or query optimizer 120. Alteration module 160 runs execution plans 122 against the synthetic data 112 generated by data synthesizer 110. Results of running the execution plans 122 against the synthetic data 112 indicates how resilient a particular query plan is to different datasets. Alteration module 160 makes updates to query optimizer 120 (optimizer updates 162) based on the query plan performance characteristics (for synthetic data) resulting from running query plans on synthetic data. In some embodiments, alteration module 160 receives input from one or more developers, the input indicating one or more optimizer updates 162 for optimizer 120 based on the query plan performance characteristics generated by alteration module 160. In various embodiments, optimizer updates 162 cause query optimizer 120 to select optimal query plans during subsequent execution (e.g., for new requests 102).

In some embodiments, data synthesizer 110 is executed by a server system separately from database system 10. In such embodiments, database system 10 transmits set 142 of database statistics and execution plans 122 to the server system for input to data synthesizer 110. Further, in such embodiments, the data synthesizer 110 generates synthetic data 112 based on the statistics 142 and plans 122 and transmits the synthetic data to database system 10. Database system 10 runs queries against the synthetic data 112 to understand the performance characteristics of query plans 122 output by query optimizer 120. Based on the performance characteristics, database system 10 may refine the query optimizer 120 to improve the performance of subsequent query plans generated by query optimizer 120. In some embodiments, database system 10 also alters selector module 150 based on the performance characteristics of query plans for the synthetic data 112. In some embodiments, database system 10 receives refinements specified by one or more developers for the optimizer 120 or selector module 150, where the refinements are determined by the one or more developers based on the performance characteristics of the query plans 122 for synthetic data 112.

In other embodiments, data synthesizer 110 is executed by database system 10 (as shown in FIG. 1). In such embodiments, the synthetic data 112 output by data synthesizer is utilized by database system 10 in an offline manner to update one or both of query optimizer 120 and selector module 150. For example, database system 10 executes a first version of query optimizer 120 and selector module 150 for a first query. In this example, after receiving synthetic data 112 from data synthesizer 110 (and running existing query plans on the synthetic data 112), database system 10 updates the query optimizer 120 and selector module 150 to a second version. Further in this example, for queries received subsequent to the first query, database system executes the second versions of query optimizer 120 and selector module 150.

Selector module 150, in the illustrated embodiment, selects one or more execution plans 122, from the plurality of execution plans 122 generated by query optimizer 120. For example, as discussed above with reference to query optimizer 120, selector module 150 may score various execution plans 122 based on the set 142 of database statistics. According to these scores, selector module 150 selects one or more of the subset of execution plans 122 generated by query optimizer 120 to produce the selected execution plan(s) 122 for execution by engine 130. These execution plans 122 contain statistical information that the data synthesizer 110 uses to generate plausible synthetic datasets. By running a query plan against these datasets, the alteration module 160 as discussed above, determines the performance characteristics of the query plan under a variety of real-world datasets that are plausible given the noted inaccuracies in the stored database statistics. Alteration module 160 uses the performance characteristics to guide future development work by adjusting the selector module 150 to select query plans that are resilient to these plausible variations in real-world datasets given the stored database statistics.

Once an execution plan 122 has been selected, execution engine 130, in various embodiments, is operable to execute the selected execution plan 122. Accordingly, engine 130 may perform the various actions listed in the execution plan 122, which may include accessing one or more data tables 145A, indexes 145B, or temporary tables 145C. Engine 130 may then return any results to service query 102. For example, execution engine 130 may cause the results of the executed query plan to be transmitted to one of computer systems 105. In some situations, execution engine 130, query optimizer 120, and data synthesizer 110 may also be referred to as "modules."

In this disclosure, various "modules" operable to perform designated functions are shown in the figures and described in detail (e.g., database statistics module 140, selector module 150, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as "operable" to perform operations refers to a software module, a hardware module, or some combination thereof. Further, for any discussion herein that refers to a module that is "executable" to perform certain operations, it is to be understood that those operations may be implemented, in other embodiments, by a hardware module "configured" to perform the operations, and vice versa.

Example Probability Models

Figure 2A:
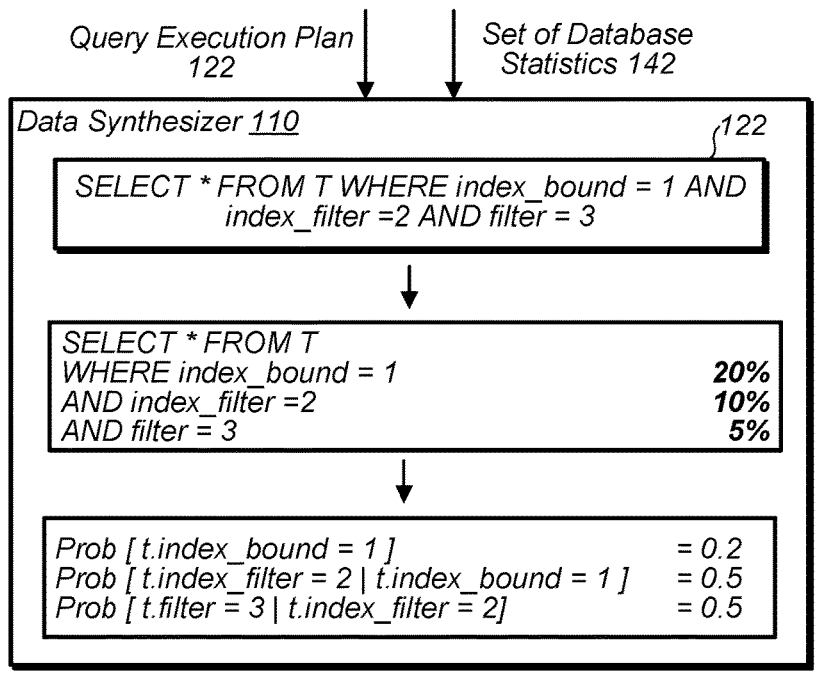
FIGS. 2A and 2B are diagrams illustrating example generation of a probability model for a given query plan and a set of database statistics, according to some embodiments.
Figure 2B:
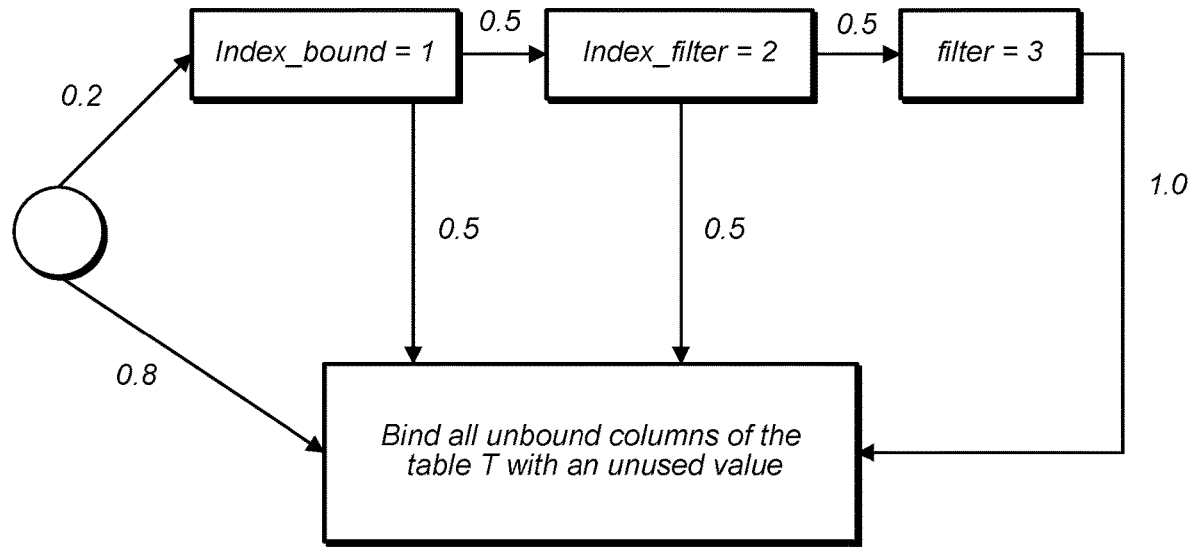

Turning now to FIGS. 2A and 2B, diagrams of example probability model generation for a given query plan and a set of database statistics are depicted. In FIG. 2A, data synthesizer 110 receives a request for a query execution plan 122 that selects, from a table, content that satisfies one or more criteria of plan 122. In the particular query plan 122 depicted in FIG. 2A, a request is made to select rows from table T having a value in column "index_bound" equal to "1," a value in column "index_filter" equal to "2," and a value in column "filter" equal to "3." Data synthesizer 110 might simply execute a scan operation on the database to identify rows that meet the criteria of a given query according to the query execution plan 122. In disclosed embodiments, however, data synthesizer 110 generates a plurality of synthetic data tuples based on query execution plan 122. Data synthesizer 110 (or alteration module 160) executes each of these query plans on the synthetic data tuples to determine which query plans perform better on the generated synthetic dataset database. In the illustrated embodiment, data synthesizer 110 determines probabilities for each criterium of query plan 122 based on the set 142 of database statistics (i.e., 20%, 10%, and 5%) shown in FIG. 2A.

Turning now to FIG. 2B, a probability model generated by data synthesizer 110 based on query execution plan 122 and set 142 of database statistics is shown. The probability model shown in FIG. 2B is a Markov model. Data synthesizer 110 generates the Markov model shown in FIG. 2B by first separating the query plan 122 into its three separate criteria and then adding a node for each of the three criteria to the Markov model. Execution of the probability model shown in FIG. 2B flows from left to right, with the circle being the starting node. When generating a synthetic data tuple using the probability model, for example, data synthesizer 110 begins at the circle on the left and proceeds via the arrows between nodes of the model until the model flow is complete (i.e., flow ends at the last node to which all arrows flow, labeled "bind all unbound columns of the table T with an unused value").

When generating the model shown in FIG. 2B, data synthesizer 110 creates three nodes for each of the three criteria specified in query execution plan 122 and places these nodes in order from left to right according to their order of appearance within query execution plan 122. For example, in the illustrated embodiment, a first node in the probability model includes the criteria "index_bound=1," a second node includes the criteria "index_filter=2," and a third node includes the criteria "filter=3." In addition to including nodes for each of the criteria of query plan 122, data synthesizer 110 adds an additional catch-all node that binds any unbound columns (due to one or more criteria within the first two nodes being unmet) of the table T with an unused value (a value other than 1, 2, or 3, in this example).

After adding the nodes shown in FIG. 2B to the probability model, data synthesizer 110 assigns probabilities to arrows between the nodes according to the probabilities calculated in FIG. 2A for each criterium of query plan 122. Data synthesizer 110 calculates the probabilities based on the set 142 of database statistics for each of the criteria. In FIG. 2B, the probability model includes probabilities for each path of the model. For example, the start node (circle) has two paths branching from it: a first path assigned a probability of 0.2 (indicating that there is a 20% chance that the value stored in the "index_bound" column of table T is equal to "1") and a second path assigned a probability of 0.8. The first node of the probability model also has two paths branching from it, with each path indicating a 50% chance that the value stored in the "index_filter" column of the table T is equal to "2." Similarly, the second node of the probability model also has two paths branching from it, with each path indicating a 50% chance that the value stored in the "filter" column of the table T is equal to "3." In contrast, the third node of the probability model has a single branch with a probability of 1.0, indicating that the likelihood that the flow proceeds to the final node is 100%. Said another way, the flow of the model proceeds to the final and fourth node if the table T includes a value equal to 3 for the third column "filter."

In various embodiments, if data synthesizer 110 were to receive a simple query request from a computer system instead of the query execution plan 122, then data synthesizer 110 might first generate a query execution plan 122 from the simple query request prior to generating synthetic data based on the query plan. For example, data synthesizer 110 may support multiple types of scan operations for identifying rows that meet the specified criteria. For example, data synthesizer 110 may support a sequential scan in which execution engine 130 (shown in FIG. 1) walks row by row examining each value in column "index_bound" and determining whether it is equal to 1. Data synthesizer 110 may also support an index scan in which an index is referenced to identify particular rows of interested. For example, an index 145B may exist that maps a given value to each row having that value in column "index_bound." Accordingly, using an index scan based on this index may be more efficient as rows having, for example, the values of 1, 1, 1, and so forth can be identified using the index without having to consider rows having values greater than or less than 1.

Figure 2C:
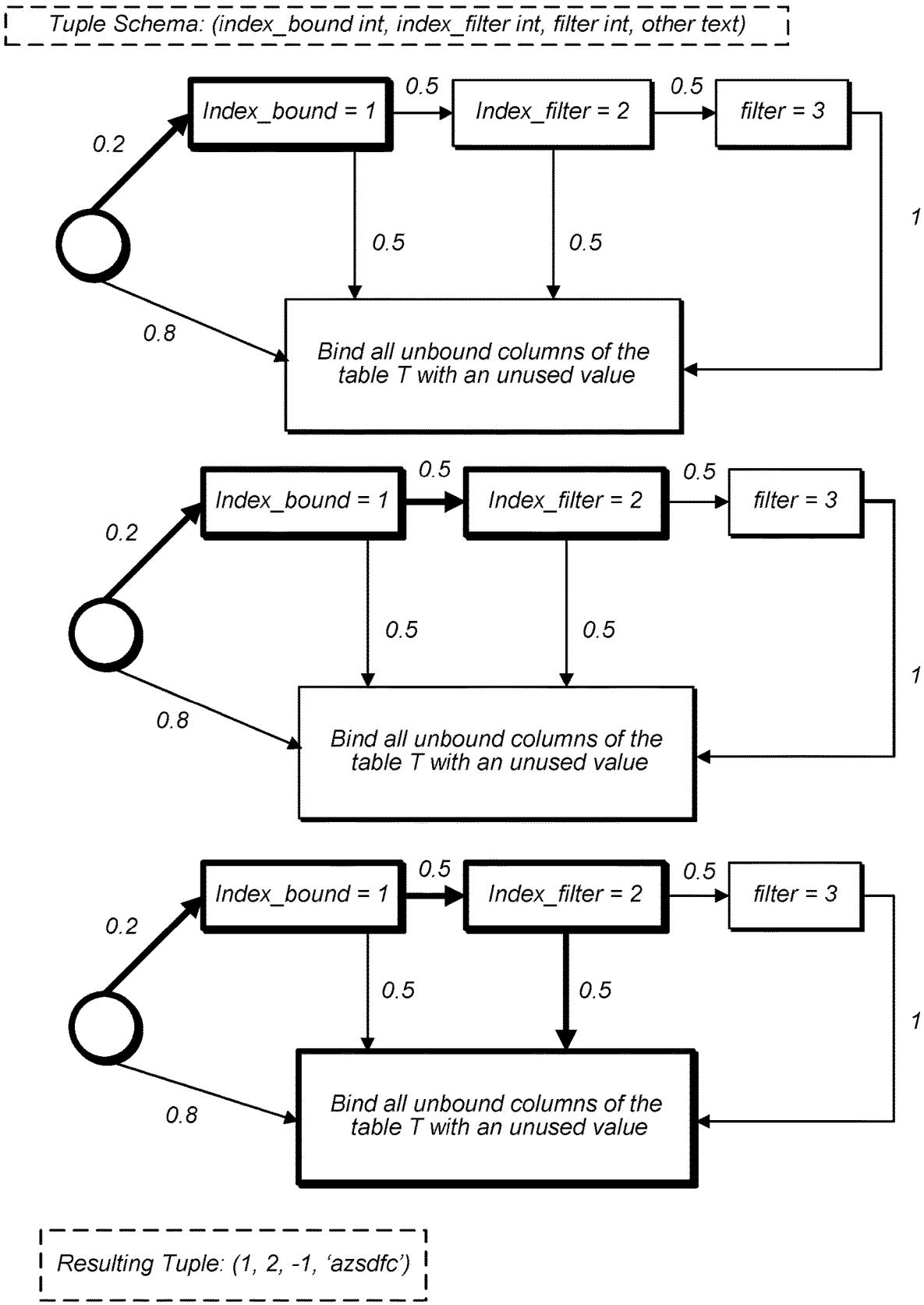
FIG. 2C is a diagram illustrating example generation of a synthetic data tuple based on the probability model shown in FIG. 2B, according to some embodiments.

Turning now to FIG. 2C, a diagram of example synthetic data tuple generation performed based on the probability model shown in FIG. 2B is depicted. As shown in FIG. 2C, the flow of the probability model generated by data synthesizer 110 in FIG. 2B proceeds from left to right (indicated by the bolded portions of the model). In addition, in FIG. 2C a tuple schema is shown, indicating the format of data tuples generated via the probability model, the tuple schema being: (index_bound integer, index_filter integer, filter integer, other text).

At the top portion of FIG. 2C, when generating a first synthetic tuple, the flow proceeds from the starting node along the 0.2 probability path, indicating that the value stored in the "index_bound" column of table T for the first synthetic tuple is "1." In the middle portion of FIG. 2C, the flow proceeds to the second node via the 0.5 probability branch, indicating that the value stored in the "index_filter" column of table T for the first synthetic tuple is "2." In the bottom portion of FIG. 2C, the flow proceeds to the third and final node via the 0.5 probability branch, indicating that the value stored in the "filter" column of table T does not equal "3." Thus, the flow proceeds to the final node of the probability model where the two final unbound columns of table T, "filter" and the other text columns are bound with the unused values "−1" and "azsdfc." The resulting synthetic data tuple, as shown at the bottom of FIG. 2C is (1, 2, −1, 'azsdfc').

Figure 3:
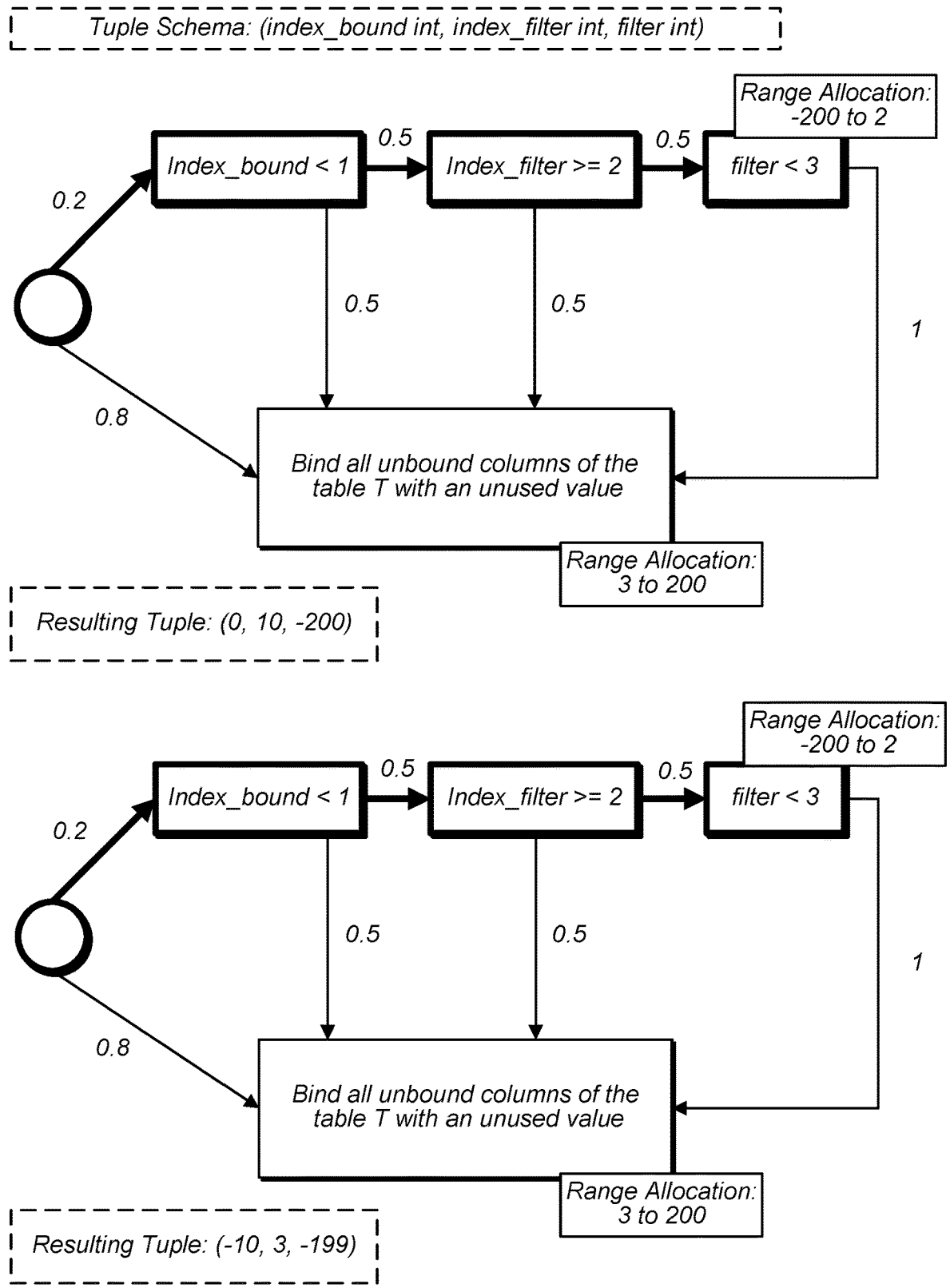
FIG. 3 is a diagram illustrating example generation of two different synthetic data tuples based on a query plan that includes inequalities, according to some embodiments.

Turning now to FIG. 3, a diagram illustrating example generation of two different synthetic data tuples based on a query plan that includes inequalities is depicted. Similar to the probability model shown in FIG. 2B, a probability model is shown in FIG. 3. In FIG. 3, two separate executions of the model are shown, resulting in two different synthetic data tuples. The probability model shown in FIG. 3, however, is generated for a query plan that includes one or more inequality criteria. In addition, a tuple schema is shown in FIG. 3 for synthetic tuples generated based on a query plan that includes the one or more inequality criteria. For example, the tuple schema includes an integer value for the "index_bound" column of table T, an integer value for the "index_filter" column of table T, and an integer value for the "filter" column of table T. In addition, the probability models shown in FIG. 3 include range allocations for both the third node representing the "filter" column of table T and the final, catch-all node that binds unbound columns of the table T with unused values. For example, the range allocation for the filter node is "−200 to 2," while the range allocation for the unbound node is "3 to 200." In various embodiments, the range allocations are set by data synthesizer 110 according to the inequalities and the values indicated in the query plan criteria. For example, data synthesizer 110 might select a range allocation of −50 to 2 for the third node of the probability model representing the "filter" column of table T. In this example, data synthesizer will select a range allocation having only values that satisfy the inequality of the "filter" node i.e., the selected range allocation may only specify a range of values that are less than "3."

In the top portion of FIG. 3, a first execution of the probability model including nodes for inequality criteria is shown. In the illustrated embodiment, the flow of execution while generating a first synthetic tuple for a given query plan is shown via a bolded portion of the model executed at the bottom of FIG. 3. For example, the first synthetic tuple is generated by setting the value of the first column "index_bound" to "0" (i.e., a value less than 1), setting the value of the second column "index_filter" to "10" (i.e., a value greater than or equal to 2), and setting the value of the third column "filter" to "−200" (i.e., any value that is less than 3 and is within the range allocation of −200 to 2). The resulting synthetic data tuple generated via execution of the probability model in the top portion of FIG. 3 is (0, 10, −200).

In the bottom portion of FIG. 3, a second execution of the probability model including nodes for inequality criteria is shown. In the illustrated embodiment, the flow of execution while generating a second synthetic tuple for a given query plan is shown via a bolded portion of the model executed at the bottom of FIG. 3. For example, the second synthetic tuple is generated by setting the value of the first column "index_bound" to "−10," setting the value of the second column "index_filter" to "3," and setting the value of the third column "filter" to "−199." The resulting synthetic data tuple generated via the execution of the probability model in the bottom portion of FIG. 3 is (−10, 3, −199).

Simultaneous Synthetic Dataset Generation

Figure 4A:
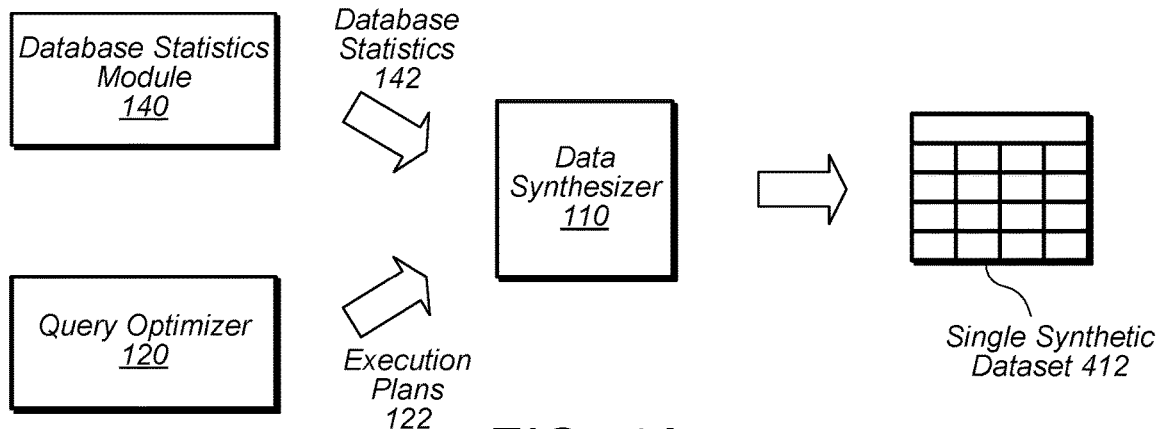
FIGS. 4A-4C are diagrams illustrating different examples of generating synthetic datasets, according to some embodiments.
Figure 4B:
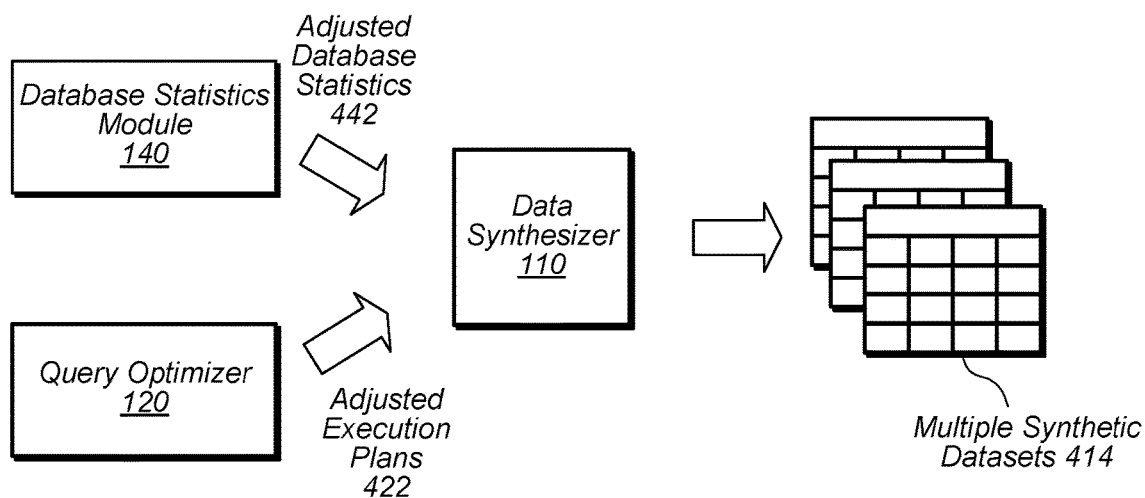
Figure 4C:
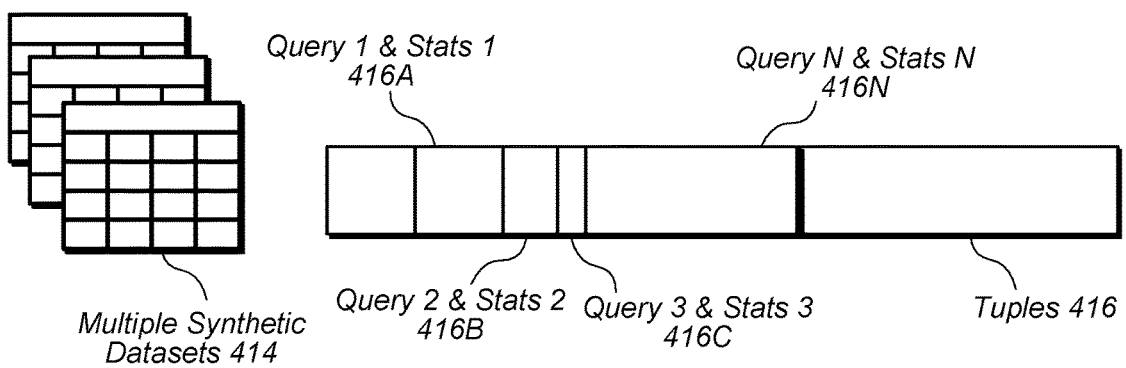

FIGS. 4A-4C are diagrams illustrating different examples of synthetic dataset generation. In FIG. 4A, data synthesizer 110 generates a single synthetic dataset 412 based on a set 142 of database statistics received from database statistics module 140 and one or more execution plans 122 received from query optimizer 120. In some embodiments, the single synthetic dataset 412 is generated based on a particular set 142 of database statistics and a single execution plan 122. In contrast, in FIG. 4B, data synthesizer 110 simultaneously generates multiple synthetic datasets 414 from an adjusted set 442 of database statistics and one or more adjusted execution plans 422. For example, data synthesizer 110 simultaneously generates a first synthetic dataset 414 based on a particular set of database statistics and a particular execution plan and generates a second synthetic dataset 414 based on adjusting the particular set of database statistics and the particular execution plan. As another example, data synthesizer 110 may simultaneously generate two different datasets 414 based on the same set of database statistics and two different execution plans (e.g., a particular execution plan and an adjusted version of the particular execution plan).

In FIG. 4C, the multiple synthetic datasets 414, generated by data synthesizer 110 in FIG. 4B, are shown relative to a set of blocks representing various tuples 416 included in the multiple synthetic datasets 414. For example, a set of tuples 416 represented by block 416A was generated by data synthesizer 110 using query plan 1 and database statistics 1, while a set of tuples 416 represented by block 416B was generated by data synthesizer 110 using query plan 2 (a different query plan than query plan 1) and database statistics 2 (a different set of database statistics than database statistics 1). These different datasets are plausible permutations of a database instance's stored statistics and account for statistic inaccuracies, as noted above. As discussed above with reference to FIG. 4B, in some embodiments, data synthesizer 110 generates multiple different synthetic datasets (including tuples 416) based on a single query plan (e.g., query plan 1) and two different sets of database statistics (e.g., database statistics 1 and database statistics 2).

Figure 5:
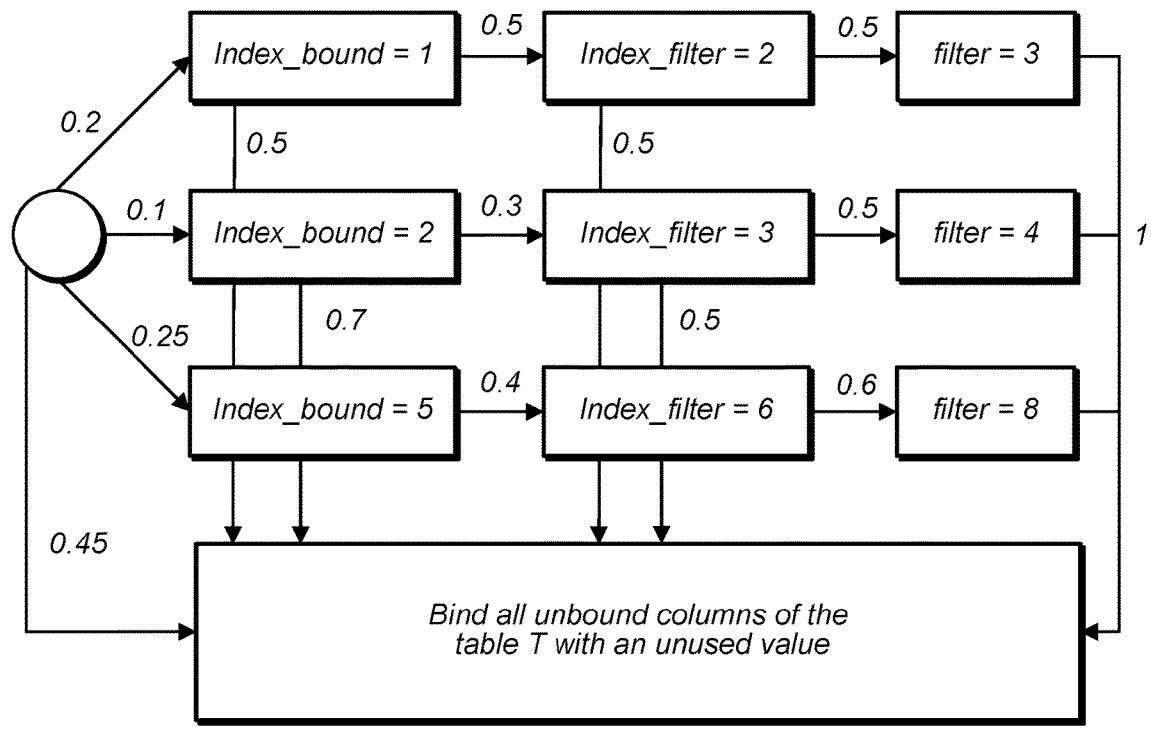
FIG. 5 is a diagram illustrating example generation of a probability model for simultaneously synthesizing multiple synthetic datasets, according to some embodiments.

Turning now to FIG. 5, an example 500 is depicted showing a probability model executed to simultaneously synthesize multiple synthetic datasets. In the illustrated embodiment, an example query plan is shown as "SELECT*FROM T WHERE index_bound=1 AND index_filter=2 AND filter=3." In addition, in the middle of FIG. 5, a probability model (a Markov model) generated by data synthesizer 110 is shown. This model is executed to simultaneously generate multiple synthetic datasets based on three different query plans. For example, data synthesizer 110 adjusts the query plan shown in the top portion of FIG. 5 to generate the following two different query plans "SELECT*FROM T WHERE index_bound=2 AND index_filter=3 AND filter=4" and "SELECT*FROM T WHERE index_bound=5 AND index_filter=6 AND filter=8." The bottom portion of FIG. 5 shows several resulting synthetic data tuples generated simultaneously using the probability model shown.

In the illustrated embodiment, simultaneous generation of a plurality of different data tuples based on three different query plans is shown. The probability model shown in FIG. 5 includes three different paths for the three different query plans generated by data synthesizer 110. When executing the probability model, data synthesizer 110 proceeds down multiple paths of the probability model at the same time during simultaneous dataset generation. For example, data synthesizer 110 generates three different synthetic data tuples at the same time. In this example, data synthesizer 110 generates a first tuple (1, 2, 3) by proceeding down a path with the following nodes: index_bound=1, index_filter=2, and filter=3. Further in this example, data synthesizer 110 simultaneously generates a second synthetic tuple (1, 2, 9) by proceeding down a path with the following nodes: index_bound=1, index_filter=2, and an unbound node set to an unused value "9." Still further in this example, data synthesizer 110 simultaneously generates a third synthetic tuple (5, 6, −1) by proceeding down a path with the following nodes: index_bound=5, index_filter=6, and an unbound node set to unused value "−1." In this example, data synthesizer 110 simultaneously generates ten different synthetic data tuples (shown at the bottom portion of FIG. 5) using the probability model shown in the middle of in FIG. 5.

In various embodiments, synthetic data is generated for query plans including two or more of a plurality of different types of query criteria such as inequalities, joins, etc. In various embodiments, multiple datasets are generated simultaneously for different query plans that include different types of query criteria. In addition to generating synthetic data for query plans that include inequalities (as discussed above with reference to FIG. 3) and generating multiple synthetic datasets simultaneously, the disclosed techniques may generate synthetic data for query plans that include joins as discussed in further detail below with reference to FIG. 6. In various embodiments, the expression of a "join" in a query may be referred to herein as a "logical join." A logical join stands in contrast to a "physical join," which is an operation performed by execution engine 130 to implement the logical join.

In various embodiments, database system 10 supports multiple types of physical joins such as a "nested loop join," "hash join," and "merge join." For example, the phase "nested loop join" is to be interpreted in accordance with its ordinary and established meaning, which includes a join in which each element in the right relation (or left relation) is scanned once for every row found in the left relation (or right relation). For example, each value in column a1 would be scanned against every value in column a2. As another example, a "hash join" is to be interpreted in accordance with its ordinary and established meaning, which includes a join in which 1) the right relation (or left relation) is first scanned and loaded into a hash table, using its join attributes as hash keys and 2) the left relation (or right relation) is scanned and the appropriate values of every row found are used as hash keys to locate the matching rows in the table. As used herein, the phrase "merge join" is to be interpreted in accordance with its ordinary and established meaning, which includes a join in which 1) each relation is sorted on the join attributes before the join starts, 2) the two relations are scanned in parallel, and 3) matching rows are combined to form join rows.

In disclosed techniques, join nodes may be added to a query plan to ensure that synthetic data values between two different data tuples in a given synthetic dataset match. For example, a join node used to generate synthetic datasets based on a given query plan that includes a join operation ensures that synthetic data values generated from two different synthetic data tables would still have overlapping data values (e.g., the synthetic data accurately represents data that might be generated during real-time execution of the given query plan).

Figure 6:
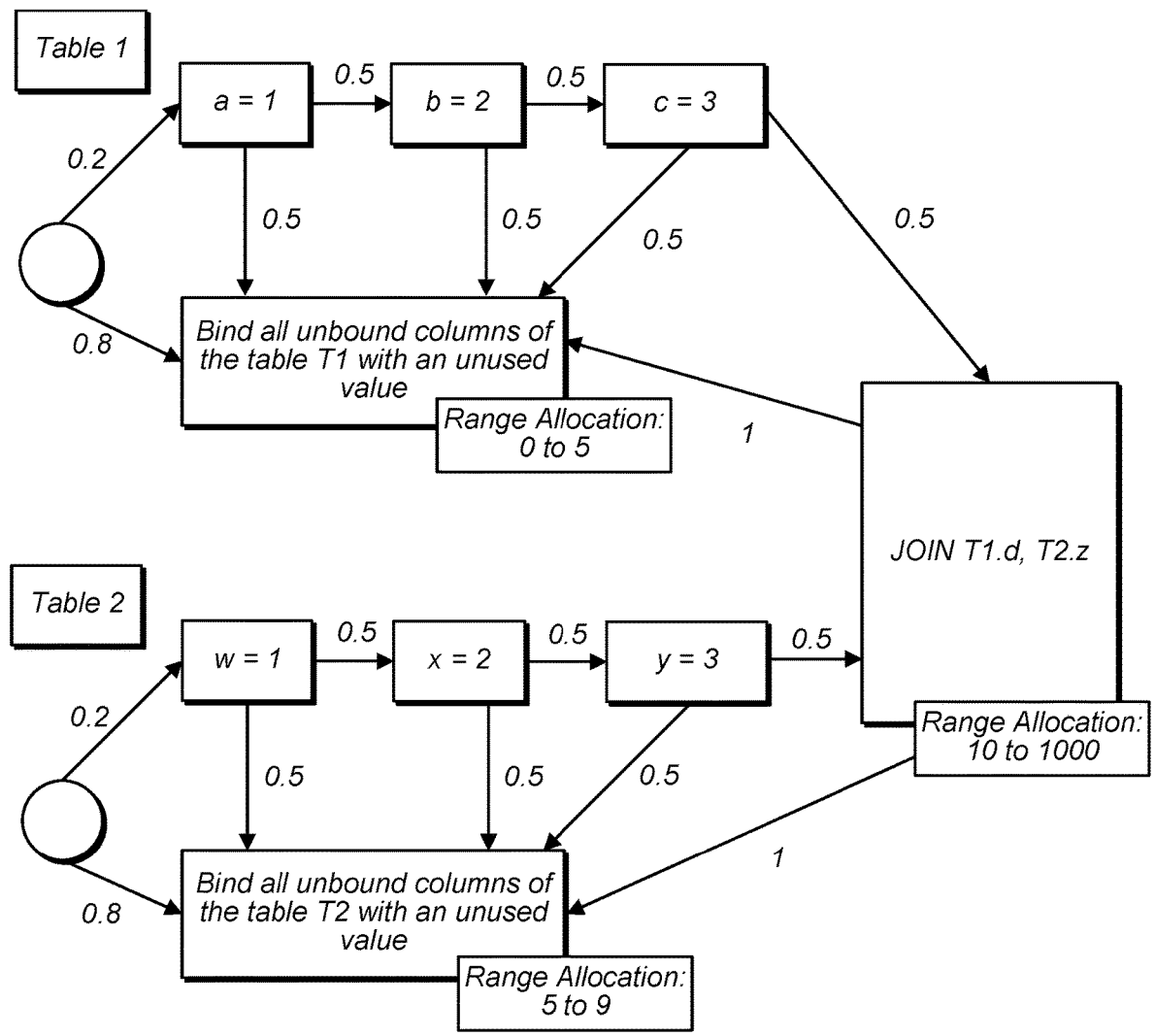
FIG. 6 is a diagram illustrating example generation of a probability model based on a query plan that includes a join for two different database tables, according to some embodiments.

Turning now to FIG. 6, a diagram illustrating an example 600 of generating a probability model based on a query plan that includes a join for two different database tables is depicted. In the illustrated embodiment, the following query plan is shown that includes a join: "T1 INNER JOIN T2 ON T1.d=T2.z. This query plan indicates to join values stored in column T1.d of table 1 and column T2.z of table 2 together. In the illustrated embodiment, a probability model generated by data synthesizer 110 (shown in FIG. 1) is depicted below the example query plan that includes a join. In the illustrated embodiment, a first portion of the probability model includes nodes for table 1, while a second portion of the probability model includes nodes for table 2. During execution of the probability model for a query plan including a join, flow either proceeds along the top portion of the model to generate tuples based on joins performed on table 1 or proceeds along the bottom portion of the model to generate tuples based on joins performed on table 2. In the illustrated embodiment, the probability model further includes a join node into which both the first portion of the model (for table 1) and the second portion of the model (for table 2) flow. In addition, the join node and the unbound nodes for tables 1 and 2, respectively, include different range allocations. For example, the join node includes a range allocation of 10 to 1000, the unbound node for table 1 includes a range allocation of 0 to 5, and the unbound node for table 2 includes a range allocation of 5 to 9. Example execution of the join probability model is discussed in detail below with reference to FIG. 7.

Figure 7:
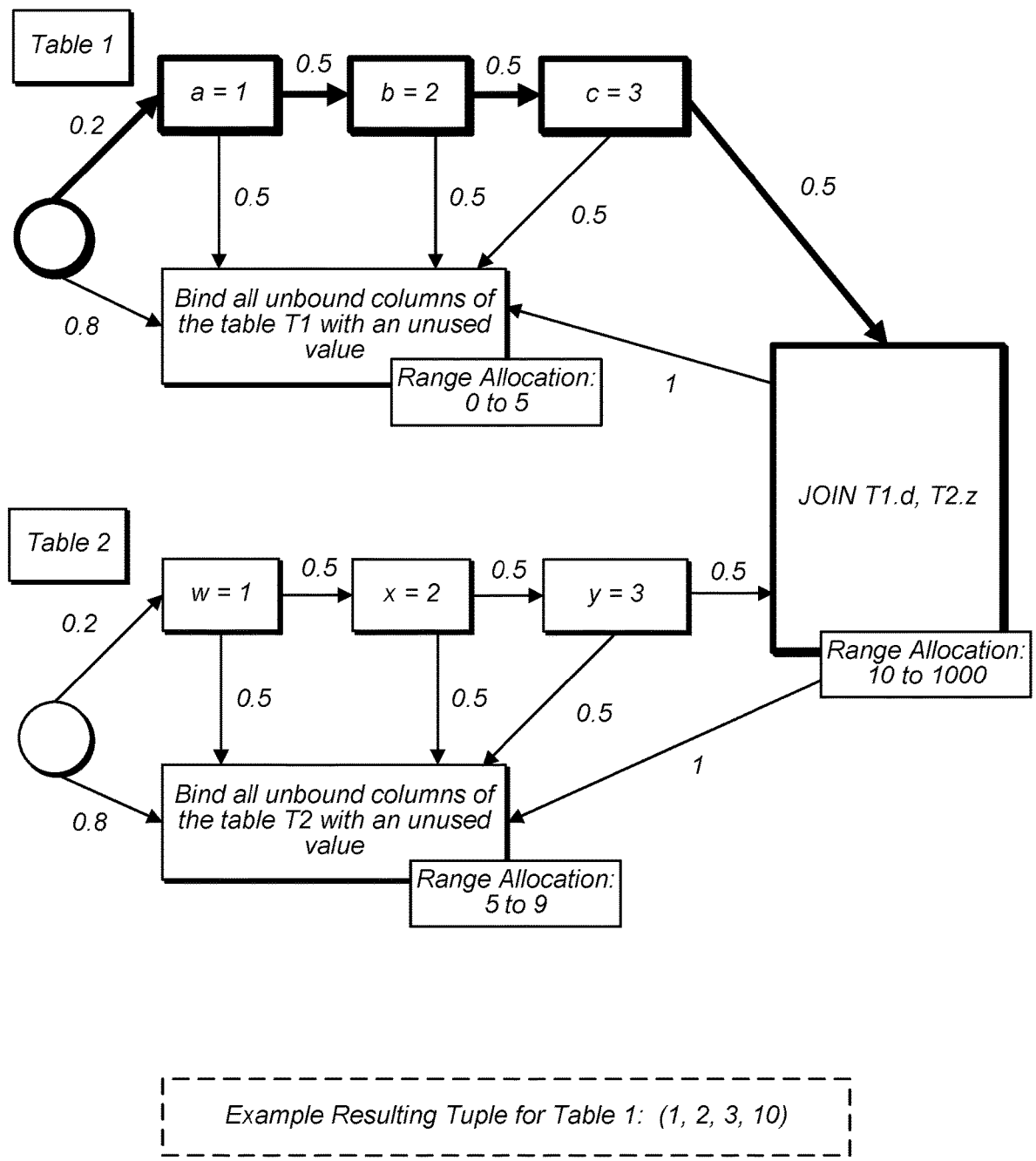
FIG. 7 is a diagram illustrating generation of synthetic data tuples for a first database table based on the query plan of FIG. 6, according to some embodiments.

Turning now to FIG. 7, a diagram illustrating generation of synthetic data tuples for a first database table based on the query plan of FIG. 6 is depicted. In FIG. 7, an example 700 of tuple generation for joins on table 1 is shown. In the illustrated embodiment, during execution of the model, flow proceeds from the top start node (the circle node for table 1)

to node a=1, to node b=2, to node c=3, to join node=10, resulting in a synthetic data tuple for table 1 of (1, 2, 3, 10).

Figure 8:
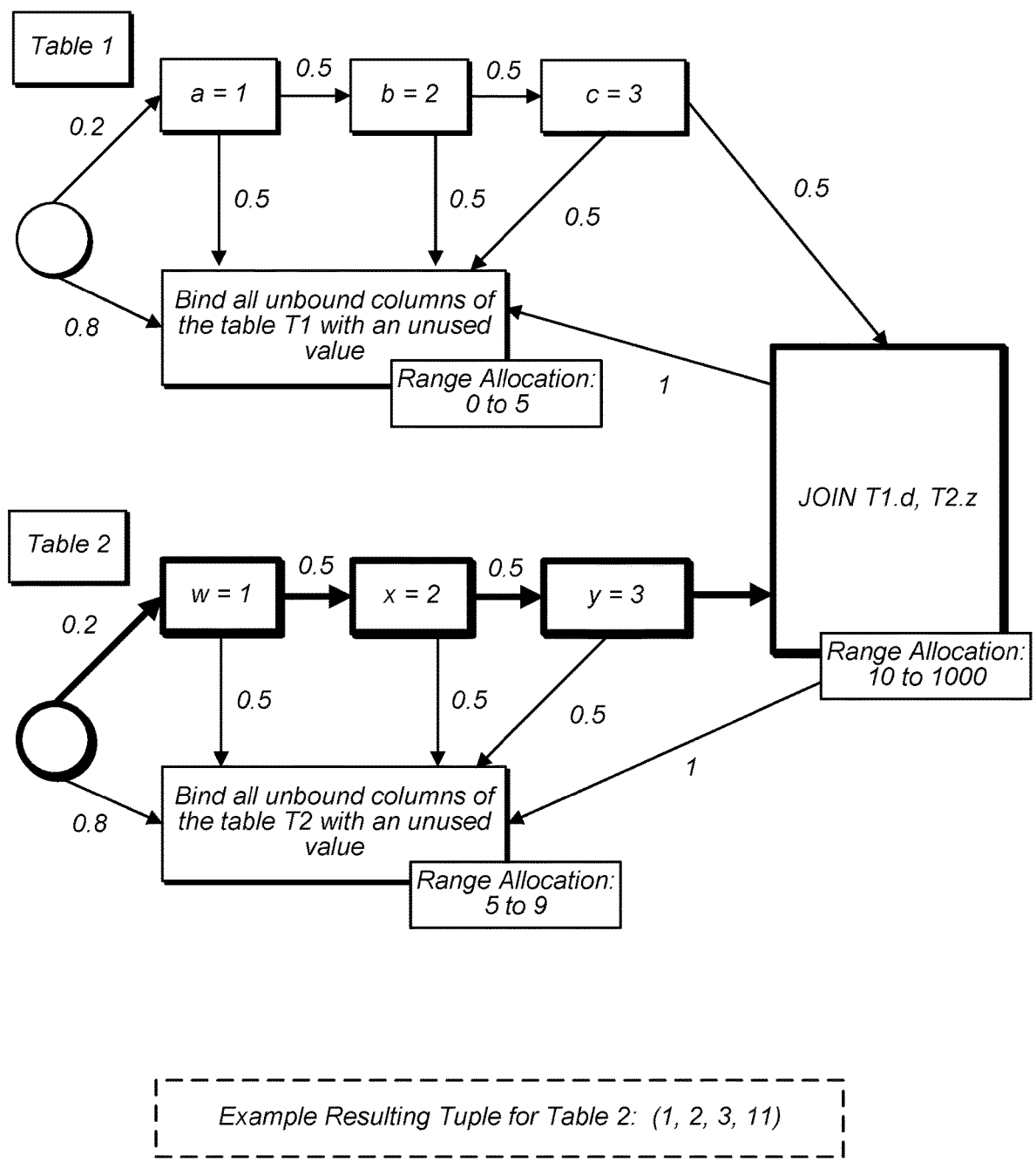
FIG. 8 is a diagram illustrating example generation of synthetic data tuples for a second database table based on the query plan of FIG. 6, according to some embodiments.

Turning now to FIG. 8, a diagram illustrating example generation of synthetic data tuples for a second database table based on the query plan of FIG. 6 is depicted. In FIG. 8, an example 800 of tuple generation for joins on table 2 is shown. In the illustrated embodiment, during execution of the model, flow proceeds along the bottom portion of the model from the top start node (the circle node for table 2) to node w=1, to node x=2, to node y=3, to join node=11, resulting in a synthetic data tuple for table 2 of (1, 2, 3, 11).

Exemplary Method

Figure 9:
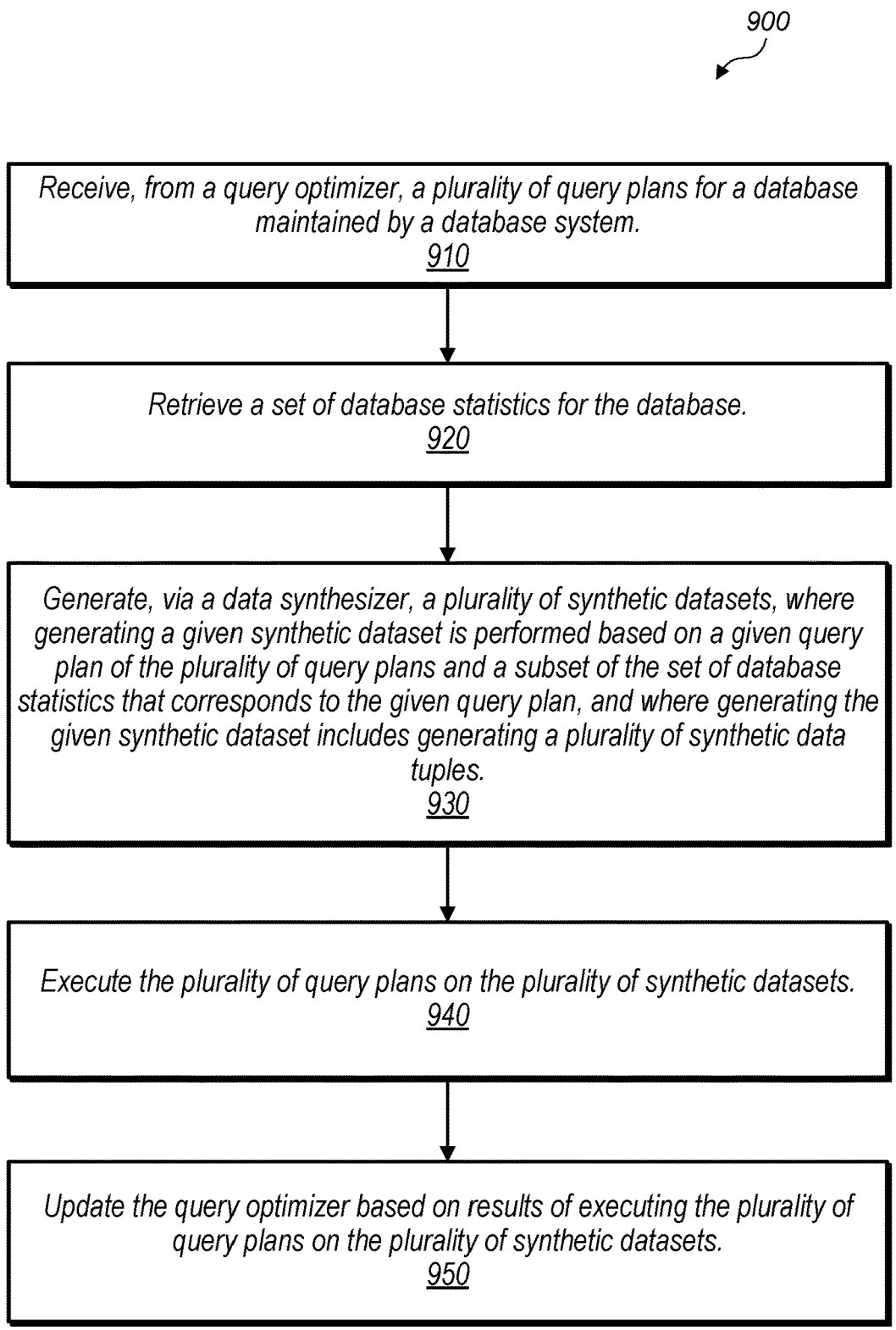
FIG. 9 is a flow diagram illustrating a method for determining optimal query plans for a database, according to some embodiments.

FIG. 9 is a flow diagram illustrating an example method for determining optimal query plans for a database, according to some embodiments. The method shown in FIG. 9 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In one embodiment, method 900 is performed by a query optimizer of a database capable of receiving optimizer constraints such as a database implemented by database system 10. In some instances, performance of method 900 allows for better execution plans to be potentially selected relative to previous query plan evaluation and selection techniques.

Method 900 begins in step 910 with receiving, by a database system from a query optimizer, a plurality of query plans for a database maintained by the database system. In various embodiments, the database system executes the query optimizer to generate the query plans in response to receiving a request from a computer system (e.g., one of computer systems 105 shown in FIG. 1) for one or more query plans. In some embodiments, the database system generates, using the query optimizer, the plurality of query plans for the database, where the generating is performed based on a plurality of historical requests to perform database operations on data stored in the database.

In step 920, the database system receives a set of database statistics for the database. In some embodiments, the set of database statistics are canned statistics. In some embodiments, the database system generates the set of database statistics for the database in response to receiving the plurality of query plans. In other embodiments, the database system receives the set of database statistics from another system that generates the set of database statistics in response to a request from the database system for the statistics. In still other embodiments, the database system retrieves the set of database statistics from a storage repository. For example, the set of database statistics are generated by a system (either the database system or another system) prior to the plurality of query plans being generated and the statistics are stored for retrieval by the database system when the query plans are generated.

In step 930, the database system generates, via a data synthesizer, a plurality of synthetic datasets, where generating a given synthetic dataset is performed based on a given query plan of the plurality of query plans and a subset of the set of database statistics that corresponds to and is exposed by the given query plan, and where generating the given synthetic dataset includes generating a plurality of synthetic data tuples. For example, unlike traditional data generation techniques, the disclosed techniques advantageously are driven by query plans themselves and database statistics exposed by these plans. Traditional data generation techniques generate data using overall database statistics (that is, statistics that cover all items in a relation in a database). In contrast, since queries generally operate over a subset of data (that which is of interest to the query), the statistics for the query are more granular and, thus, the disclosed techniques capture database statistics in terms of the different stages of a query's execution. Such techniques may advantageously simplify the data generation process. For example, traditional techniques attempt to generate data according to overall database statistics such that any possible query would retrieve the same result set size as data that follows the distribution described by the statistics. In contrast, disclosed techniques generate data that operates well for a particular query plan and its corresponding statistics, as relevant to that particular plan., thereby reducing the complexity of the data generation process. As one example, the disclosed techniques operate such that given a subset of database statistics relevant for a particular query, the techniques generate a synthetic dataset such that when the particular query plan is run over the dataset, it returns the same number of rows for each of its operators (execution stages) as if it was run on the real world dataset from which the statistics are derived.

In some embodiments, the subset of the set of database statistics includes database statistics for respective stages of a plurality of stage of the query plan. In some embodiments, the database system generates a given synthetic dataset of the plurality of datasets by separating the given query plan into a plurality of stages and generating a probability model that includes nodes representing two or more stages of the given query plan and edges between the nodes representing the probability of moving between the two or more stages during execution of the given query plan according to the set of database statistics. In some embodiments, the generating includes performing a plurality of random walkthroughs of the probability model, where each walkthrough of the probability model produces a synthetic data tuple. In some embodiments, the probability model is a Markov model, where the plurality of stages of the given query plan are assigned to different states of the Markov model, and where the set of database statistics are used to determine transition probabilities between the different states.

In some embodiments, generating the plurality of synthetic datasets is performed simultaneously using the given query plan and by adjusting the set of database statistics when generating respective ones of the plurality of synthetic data tuples. For example, by slightly altering the statistics of the database, the database system is able to generate slightly different sets of synthetic data using the same query plan. In some embodiments, the given query plan includes a join stage. In some embodiments, generating the plurality of synthetic datasets is performed simultaneously using the set of database statistics and by switching between different query plans of the plurality of query plans when generating respective ones of the plurality of synthetic data tuples.

In some embodiments, generating a given synthetic dataset of the plurality of synthetic datasets is performed by separating the given query plan into a plurality of stages, including a join stage. In some embodiments, the generating includes generating a probability model, the probability model including: a first set of nodes representing two or more stages of the given query plan performed on a first database table and edges between the first set of nodes representing the probability of moving between the two or more stages during execution of the given query plan according to the set of database statistics. In some embodiments, the probability model includes a second set of nodes representing two or more stages of the given query plan performed on a second database table and edges between the second set of nodes representing the probability of moving between the two or more stages during execution of the given query plan according to the set of database statistics. In some embodiments, the probability model includes a join node, representing the join stage of the given query plan, after the first and second sets of nodes that includes two edges from a last node of each of the first set of nodes and the second set of nodes.

In step 940, the system executes the plurality of query plans on the plurality of synthetic datasets. In some embodiments, the subset of the set of database statistics includes database statistics for respective stages of a plurality of stages of the query plan. For example, the subset of database statistics are statistics that are relevant to a given query plan (as opposed to the set of statistics for the entire relation). For example, if a relation has three tuples with a single column and it stores three values A, B, and C, then a third of its values are A, a third are B, and a third are C (which is an example of general database statistics). A query that restricts the items of interest to only A values would report that a third of the values are A and two thirds are not. In this example, it does not matter what the other values are, because they do not match the value A and, therefore, are not relevant to the query. In some embodiments, the database system executes the updated query optimizer to generate one or more query plans for the database.

In step 950, the system updates the query optimizer based on results of executing the plurality of query plans on the plurality of synthetic datasets. In some embodiments, the database maintained by the database system is a distributed multi-tenant database storing data for two or more tenants, where the distributed multi-tenant database includes a plurality of database instances that are geographically distributed. In some embodiments, the database system selects, via the updated query optimizer, one or more of the plurality of query plans for execution on the database. In some embodiments, the database system executes the selected one or more query plans to perform one or more database operations on the database.

Exemplary Multi-Tenant Database System

Figure 10:
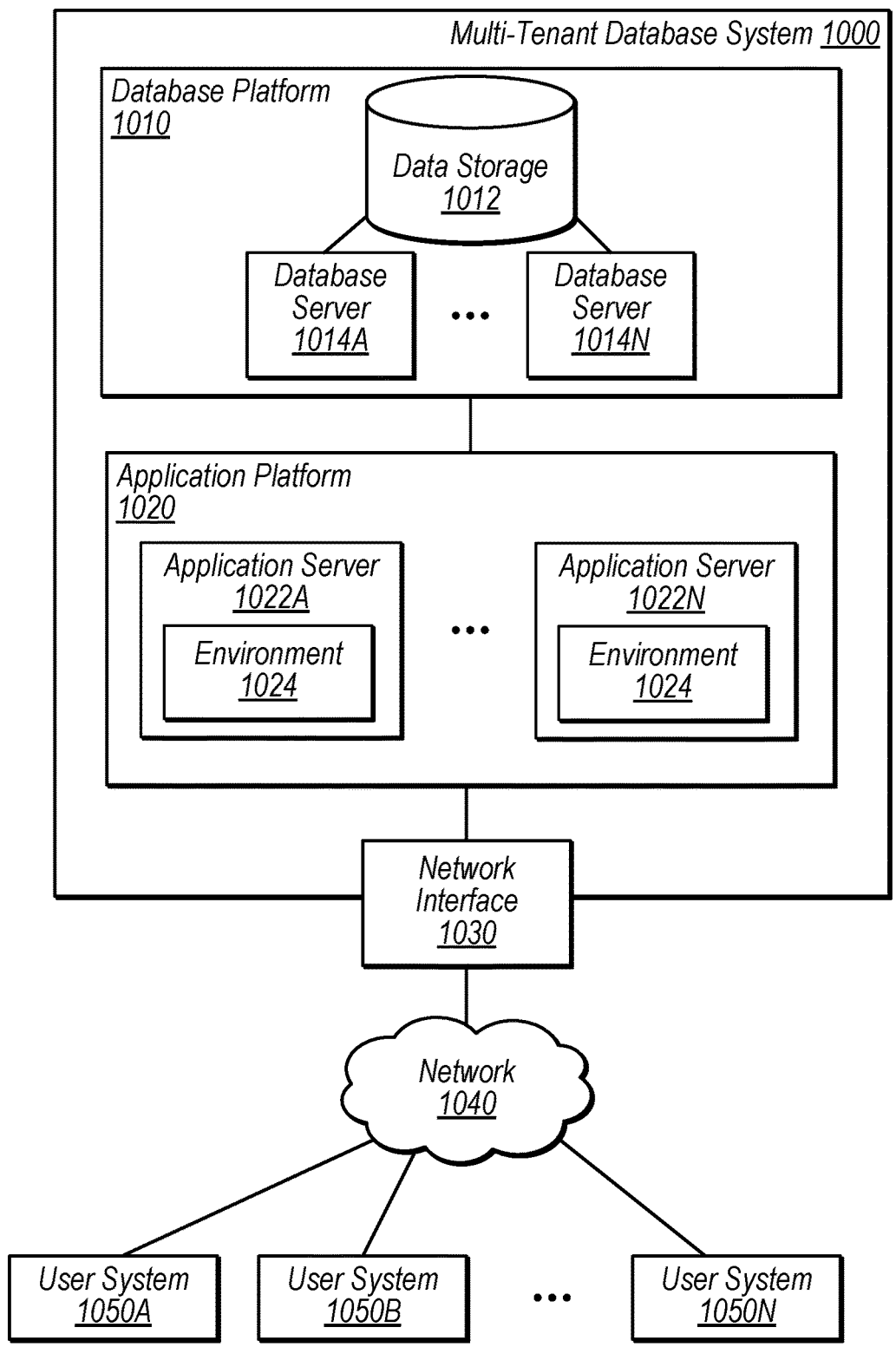
FIG. 10 is a block diagram illustrating elements of a multi-tenant system, according to some embodiments.

Turning now to FIG. 10, an exemplary multi-tenant database system (MTS) 1000 in which various techniques of the present disclosure can be implemented is shown—e.g., database system 10 may be MTS 1000. In FIG. 10, MTS 1000 includes a database platform 1010, an application platform 1020, and a network interface 1030 connected to a network 1040. Also as shown, database platform 1010 includes a data storage 1012 and a set of database servers 1014A-N that interact with data storage 1012, and application platform 1020 includes a set of application servers 1022A-N having respective environments 1024. In the illustrated embodiment, MTS 1000 is connected to various user systems 1050A-N through network 1040. The disclosed multi-tenant system is included for illustrative purposes and is not intended to limit the scope of the present disclosure. In other embodiments, techniques of this disclosure are implemented in non-multi-tenant environments such as client/server environments, cloud computing environments, clustered computers, etc.

MTS 1000, in various embodiments, is a set of computer systems that together provide various services to users (alternatively referred to as "tenants") that interact with MTS 1000. In some embodiments, MTS 1000 implements a customer relationship management (CRM) system that provides a mechanism for tenants (e.g., companies, government bodies, etc.) to manage their relationships and interactions with customers and potential customers. For example, MTS 1000 might enable tenants to store customer contact information (e.g., a customer's website, email address, telephone number, and social media data), identify opportunities, record service issues, and manage marketing campaigns. MTS 1000 may also enable those tenants to identify how customers have been communicated with, what the customers have bought, when the customers last purchased items, and what the customers paid. To provide the services of a CRM system and/or other services, as shown, MTS 1000 includes a database platform 1010 and an application platform 1020.

Database platform 1010, in various embodiments, is a combination of hardware elements and software routines that implement database services for storing and managing data of MTS 1000, including tenant data. As shown, database platform 1010 includes data storage 1012. Data storage 1012, in various embodiments, includes a set of storage devices (e.g., solid state drives, hard disk drives, etc.) that are connected together on a network (e.g., a storage attached network (SAN)) and configured to redundantly store data to prevent data loss. In various embodiments, data storage 1012 is used to implement a database (e.g., database 145) comprising a collection of information that is organized in a way that allows for access, storage, and manipulation of the information. Data storage 1012 may implement a single database, a distributed database, a collection of distributed databases, a database with redundant online or offline backups or other redundancies, etc. As part of implementing the database, data storage 1012 may store files that include one or more database records having respective data payloads (e.g., values for fields of a database table, such as data table 145A shown in FIG. 1) and metadata (e.g., a key value, timestamp, table identifier of the table associated with the record, tenant identifier of the tenant associated with the record, etc.).

In various embodiments, a database record may correspond to a row of a table. A table generally contains one or more data categories that are logically arranged as columns or fields in a viewable schema. Accordingly, each record of a table may contain an instance of data for each category defined by the fields. For example, a database may include a table that describes a customer with fields for basic contact information such as name, address, phone number, fax number, etc. A record, therefore, for that table may include a value for each of the fields (e.g., a name for the name field) in the table. Another table might describe a purchase order, including fields for information such as customer, product, sale price, date, etc. In various embodiments, standard entity tables are provided for use by all tenants, such as tables for account, contact, lead and opportunity data, each containing pre-defined fields. MTS 1000 may store, in the same table, database records for one or more tenants—that is, tenants may share a table. Accordingly, database records, in various embodiments, include a tenant identifier that indicates the owner of a database record. As a result, the data of one tenant is kept secure and separate from that of other tenants so that the one tenant does not have access to another tenant's data, unless such data is expressly shared.

In some embodiments, the data stored at data storage 1012 is organized as part of a log-structured merge-tree (LSM tree). An LSM tree normally includes two high-level components: an in-memory buffer and a persistent storage. In operation, a database server 1014 may initially write database records into a local in-memory buffer before later flushing those records to the persistent storage (e.g., data storage 1012). As part of flushing database records, the database server 1014 may write the database records into new files that are included in a "top" level of the LSM tree. Over time, the database records may be rewritten by database servers 1014 into new files included in lower levels as the database records are moved down the levels of the LSM tree. In various implementations, as database records age and are moved down the LSM tree, they are moved to slower and slower storage devices (e.g., from a solid state drive to a hard disk drive) of data storage 1012.

When a database server 1014 wishes to access a database record for a particular key, the database server 1014 may traverse the different levels of the LSM tree for files that potentially include a database record for that particular key. If the database server 1014 determines that a file may include a relevant database record, the database server 1014 may fetch the file from data storage 1012 into a memory of the database server 1014. The database server 1014 may then check the fetched file for a database record having the particular key. In various embodiments, database records are immutable once written to data storage 1012. Accordingly, if the database server 1014 wishes to modify the value of a row of a table (which may be identified from the accessed database record), the database server 1014 writes out a new database record to the top level of the LSM tree. Over time, that database record is merged down the levels of the LSM tree. Accordingly, the LSM tree may store various database records for a database key where the older database records for that key are located in lower levels of the LSM tree than newer database records.

Database servers 1014, in various embodiments, are hardware elements, software routines, or a combination thereof capable of providing database services, such as data storage, data retrieval, and/or data manipulation. A database server 1014 may correspond to one of a plurality of database nodes included in a database system (e.g., database system 10). Such database services may be provided by database servers 1014 to components (e.g., application servers 1022) within MTS 1000 and to components external to MTS 1000. As an example, a database server 1014 may receive a database transaction request from an application server 1022 that is requesting data to be written to or read from data storage 1012. The database transaction request may specify an SQL SELECT command to select one or more rows from one or more database tables. The contents of a row may be defined in a database record and thus database server 1014 may locate and return one or more database records that correspond to the selected one or more table rows. In various cases, the database transaction request may instruct database server 1014 to write one or more database records for the LSM tree—database servers 1014 maintain the LSM tree implemented on database platform 1010. In some embodiments, database servers 1014 implement a relational database management system (RDMS) or object-oriented database management system (OODBMS) that facilitates storage and retrieval of information against data storage 1012. In various cases, database servers 1014 may communicate with each other to facilitate the processing of transactions. For example, database server 1014A may communicate with database server 1014N to determine if database server 1014N has written a database record into its in-memory buffer for a particular key.

Application platform 1020, in various embodiments, is a combination of hardware elements and software routines that implement and execute CRM software applications as well as provide related data, code, forms, web pages and other information to and from user systems 1050 and store related data, objects, web page content, and other tenant information via database platform 1010. In order to facilitate these services, in various embodiments, application platform 1020 communicates with database platform 1010 to store, access, and manipulate data. In some instances, application platform 1020 may communicate with database platform 1010 via different network connections. For example, one application server 1022 may be coupled via a local area network and another application server 1022 may be coupled via a direct network link. Transfer Control Protocol and Internet Protocol (TCP/IP) are exemplary protocols for communicating between application platform 1020 and database platform 1010, however, it will be apparent to those skilled in the art that other transport protocols may be used depending on the network interconnect used.

Application servers 1022, in various embodiments, are hardware elements, software routines, or a combination thereof capable of providing services of application platform 1020, including processing requests received from tenants of MTS 1000. Application servers 1022, in various embodiments, can spawn environments 1024 that are usable for various purposes, such as providing functionality for developers to develop, execute, and manage applications (e.g., business logic). Data may be transferred into an environment 1024 from another environment 1024 and/or from database platform 1010. In some cases, environments 1024 cannot access data from other environments 1024 unless such data is expressly shared. In some embodiments, multiple environments 1024 can be associated with a single tenant.

Application platform 1020 may provide user systems 1050 access to multiple, different hosted (standard and/or custom) applications, including a CRM application and/or applications developed by tenants. In various embodiments, application platform 1020 may manage creation of the applications, testing of the applications, storage of the applications into database objects at data storage 1012, execution of the applications in an environment 1024 (e.g., a virtual machine of a process space), or any combination thereof. In some embodiments, application platform 1020 may add and remove application servers 1022 from a server pool at any time for any reason, there may be no server affinity for a user and/or organization to a specific application server 1022. In some embodiments, an interface system (not shown) implementing a load balancing function (e.g., an F5 Big-IP load balancer) is located between the application servers 1022 and the user systems 1050 and is configured to distribute requests to the application servers 1022. In some embodiments, the load balancer uses a least connections algorithm to route user requests to the application servers 1022. Other examples of load balancing algorithms, such as are round robin and observed response time, also can be used. For example, in certain embodiments, three consecutive requests from the same user could hit three different servers 1022, and three requests from different users could hit the same server 1022.

In some embodiments, MTS 1000 provides security mechanisms, such as encryption, to keep each tenant's data separate unless the data is shared. If more than one server 1014 or 1022 is used, they may be located in close proximity to one another (e.g., in a server farm located in a single building or campus), or they may be distributed at locations remote from one another (e.g., one or more servers 1014 located in city A and one or more servers 1022 located in city B). Accordingly, MTS 1000 may include one or more logically and/or physically connected servers distributed locally or across one or more geographic locations.

One or more users (e.g., via user systems 1050) may interact with MTS 1000 via network 1040. User system 1050 may correspond to, for example, a tenant of MTS 1000, a provider (e.g., an administrator) of MTS 1000, or a third party. Each user system 1050 may be a desktop personal computer, workstation, laptop, PDA, cell phone, or any Wireless Access Protocol (WAP) enabled device or any other computing device capable of interfacing directly or indirectly to the Internet or other network connection. User system 1050 may include dedicated hardware configured to interface with MTS 1000 over network 1040. User system 1050 may execute a graphical user interface (GUI) corresponding to MTS 1000, an HTTP client (e.g., a browsing program, such as Microsoft's Internet Explorer™ browser, Netscape's Navigator™ browser, Opera's browser, or a WAP-enabled browser in the case of a cell phone, PDA or other wireless device, or the like), or both, allowing a user (e.g., subscriber of a CRM system) of user system 1050 to access, process, and view information and pages available to it from MTS 1000 over network 1040. Each user system 1050 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 1000 or other systems or servers. As discussed above, disclosed embodiments are suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

Because the users of user systems 1050 may be users in differing capacities, the capacity of a particular user system 1050 might be determined one or more permission levels associated with the current user. For example, when a user is using a particular user system 1050 to interact with MTS 1000, that user system 1050 may have capacities (e.g., user privileges) allotted to that user. But when an administrator is using the same user system 1050 to interact with MTS 1000, the user system 1050 may have capacities (e.g., administrative privileges) allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level. There may also be some data structures managed by MTS 1000 that are allocated at the tenant level while other data structures are managed at the user level.

In some embodiments, a user system 1050 and its components are configurable using applications, such as a browser, that include computer code executable on one or more processing elements. Similarly, in some embodiments, MTS 1000 (and additional instances of MTSs, where more than one is present) and their components are operator configurable using application(s) that include computer code executable on processing elements. Thus, various operations described herein may be performed by executing program instructions stored on a non-transitory computer-readable medium and executed by processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the disclosed embodiments can be implemented in any programming language that can be executed on a server or server system such as, for example, in C, C+, HTML, Java, JavaScript, or any other scripting language, such as VBScript.

Network 1040 may be a LAN (local area network), WAN (wide area network), wireless network, point-to-point network, star network, token ring network, hub network, or any other appropriate configuration. The global internetwork of networks, often referred to as the "Internet" with a capital "I," is one example of a TCP/IP (Transfer Control Protocol and Internet Protocol) network. It should be understood, however, that the disclosed embodiments may utilize any of various other types of networks.

User systems 1050 may communicate with MTS 1000 using TCP/IP and, at a higher network level, use other common Internet protocols to communicate, such as HTTP, FTP, AFS, WAP, etc. For example, where HTTP is used, user system 1050 might include an HTTP client commonly referred to as a "browser" for sending and receiving HTTP messages from an HTTP server at MTS 1000. Such a server might be implemented as the sole network interface between MTS 1000 and network 1040, but other techniques might be used as well or instead. In some implementations, the interface between MTS 1000 and network 1040 includes load sharing functionality, such as round-robin HTTP request distributors to balance loads and distribute incoming HTTP requests evenly over a plurality of servers.

In various embodiments, user systems 1050 communicate with application servers 1022 to request and update system-level and tenant-level data from MTS 1000 that may require one or more queries to data storage 1012. In some embodiments, MTS 1000 automatically generates one or more SQL statements (the SQL query) designed to access the desired information. In some cases, user systems 1050 may generate requests having a specific format corresponding to at least a portion of MTS 1000. As an example, user systems 1050 may request to move data objects into a particular environment 1024 using an object notation that describes an object relationship mapping (e.g., a JavaScript object notation mapping) of the specified plurality of objects.

Exemplary Computer System

Figure 11:
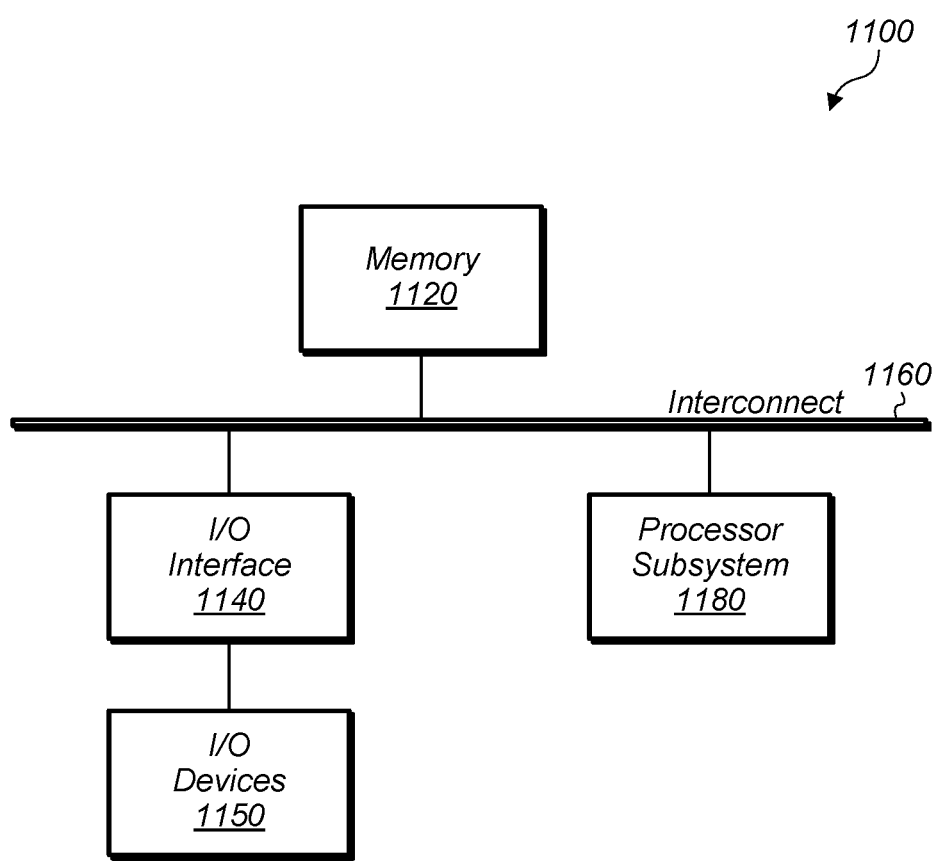
FIG. 11 is a block diagram illustrating an exemplary computer system, according to some embodiments.

Turning now to FIG. 11 a block diagram of an exemplary computer system 1100, which may implement database system 10, is depicted. Computer system 1100 includes a processor subsystem 1180 that is coupled to a system memory 1120 and I/O interfaces(s) 1140 via an interconnect 1160 (e.g., a system bus). I/O interface(s) 1140 is coupled to one or more I/O devices 1150. Computer system 1100 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 1100 is shown in FIG. 11 for convenience, system 1400 may also be implemented as two or more computer systems operating together.

Processor subsystem 1180 may include one or more processors or processing units. In various embodiments of computer system 1100, multiple instances of processor subsystem 1180 may be coupled to interconnect 1160. In various embodiments, processor subsystem 1180 (or each processor unit within 1180) may contain a cache or other form of on-board memory.

System memory 1120 is usable store program instructions executable by processor subsystem 1180 to cause system 1100 perform various operations described herein. System memory 1120 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 1100 is not limited to primary storage such as memory 1120. Rather, computer system 1100 may also include other forms of storage such as cache memory in processor subsystem 1180 and secondary storage on I/O Devices 1150 (e.g., a hard drive, storage array, etc.). In some embodiments, these other forms of storage may also store program instructions executable by processor subsystem 1180. In some embodiments, portions of database system 10 described above may include (or be included within) system memory 1120.

I/O interfaces 1140 may be any of various types of interfaces configured to couple to and communicate with other devices, according to various embodiments. In one embodiment, I/O interface 1140 is a bridge chip (e.g., Southbridge) from a front-side to one or more back-side buses. I/O interfaces 1140 may be coupled to one or more I/O devices 1150 via one or more corresponding buses or other interfaces. Examples of I/O devices 1150 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 1100 is coupled to a network via a network interface device 1150 (e.g., configured to communicate over Wi-Fi, Bluetooth, Ethernet, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112 (f) for that claim element. Should Applicant wish to invoke Section 112 (f) during prosecution of a United States patent application based on this disclosure, it will recite claim elements using the "means for" [performing a function] construct.

What is claimed is:

1. A method, comprising:
   receiving, by a database system from a query optimizer, a plurality of query plans for a database maintained by the database system;
   retrieving, by the database system, a set of database statistics for the database;
   generating, by the database system via a data synthesizer, a plurality of synthetic datasets, wherein generating a given synthetic dataset of the plurality of synthetic datasets includes:
   separating a given query plan of the plurality of query plans into a plurality of stages; and
   generating a probability model that includes nodes representing two or more stages of the given query plan and edges between the nodes representing the probability of moving between the two or more stages during execution of the given query plan according to the set of database statistics, wherein generating the given synthetic dataset includes generating a plurality of synthetic data tuples;

executing, by the database system, the plurality of query plans on the plurality of synthetic datasets; and updating, by the database system, the query optimizer based on results of executing the plurality of query plans on the plurality of synthetic datasets.

2. The method of claim 1, wherein a subset of the set of database statistics includes database statistics for respective stages of the plurality of stages of the given query plan.

3. The method of claim 1, further comprising:

selecting, by the database system via the updated query optimizer, one or more of the plurality of query plans for execution on the database; and executing, by the database system, the selected one or more query plans to perform one or more database operations on the database.

4. The method of claim 1, wherein the generating includes performing a plurality of random walkthroughs of the probability model, and wherein each walkthrough of the probability model produces a synthetic data tuple.

5. The method of claim 1, wherein the probability model is a Markov model, wherein the plurality of stages of the given query plan are assigned to different states of the Markov model, and wherein the set of database statistics are used to determine transition probabilities between the different states.

6. The method of claim 1, wherein generating the plurality of synthetic datasets is performed simultaneously using the given query plan and by adjusting the set of database statistics when generating respective ones of the plurality of synthetic data tuples.

7. The method of claim 1, wherein the given query plan includes a join stage, wherein generating the given synthetic dataset of the plurality of synthetic datasets is performed by:

separating the given query plan into the plurality of stages, including the join stage;

generating the probability model, the probability model including:

a first set of nodes representing two or more stages of the given query plan performed on a first database table and edges between the first set of nodes representing the probability of moving between the two or more stages during execution of the given query plan according to the set of database statistics;

a second set of nodes representing two or more stages of the given query plan performed on a second database table and edges between the second set of nodes representing the probability of moving between the two or more stages during execution of the given query plan according to the set of database statistics; and a join node, representing the join stage of the given query plan, after the first and second sets of nodes, wherein the join node includes two edges from a last node of each of the first set of nodes and the second set of nodes.

8. The method of claim 1, wherein the database maintained by the database system is a distributed multi-tenant database storing data for two or more tenants, and wherein the distributed multi-tenant database includes a plurality of geographically distributed database instances.

9. A non-transitory computer-readable medium having instructions stored thereon that are capable of causing a database system to implement operations comprising:

receiving, from a query optimizer, a plurality of query plans for a database maintained by the database system;

retrieving a set of database statistics for the database;

generating, via a data synthesizer, a plurality of synthetic datasets, wherein generating a given synthetic dataset of the plurality of synthetic datasets includes:

separating a given query plan of the plurality of query plans into a plurality of stages; and generating a probability model that includes nodes representing two or more stages of the given query plan and edges between the nodes representing the probability of moving between the two or more stages during execution of the given query plan according to the set of database statistics, wherein generating the given synthetic dataset includes generating a plurality of synthetic data tuples;

executing the plurality of query plans on the plurality of synthetic datasets; and updating the query optimizer based on results of executing the plurality of query plans on the plurality of synthetic dataset.

10. The non-transitory computer-readable medium of claim 9, wherein the operations further comprise:

selecting, by the database system via the updated query optimizer, one or more of the plurality of query plans for execution on the database; and executing, by the database system, the selected one or more query plans to perform one or more database operations on the database.

11. The non-transitory computer-readable medium of claim 9, wherein generating the given synthetic dataset of the plurality of synthetic datasets further includes:

performing a plurality of random walkthroughs of the probability model, wherein each walkthrough of the probability model produces a synthetic data tuple.

12. The non-transitory computer-readable medium of claim 9, wherein generating the plurality of synthetic datasets is performed simultaneously using the set of database statistics and by switching between different query plans of the plurality of query plans when generating respective ones of the plurality of synthetic data tuples.

13. The non-transitory computer-readable medium of claim 9, wherein the given query plan includes a join stage, wherein generating the given synthetic dataset of the plurality of synthetic datasets is performed by generating the probability model, wherein the probability model includes:

a first portion representing stages of the given query plan performed on a first database table;

a second portion representing stages of the given query plan performed on a second database table; and a third portion including a join node connecting the first portion and the second portion, wherein the third portion represents the join stage of the given query plan.

14. A system, comprising at least one processor; and a memory having program instructions stored thereon that are executable by the at least one processor to cause the system to:

receive, from one or more computer systems, a request to perform one or more database operations on a database;

retrieve a plurality of query plans generated by a query optimizer for executing database operations on the database;

generate, based on data stored in the database, canned statistics for the database;
generate, via a data synthesizer, a plurality of synthetic datasets, wherein generating a given synthetic dataset of the plurality of synthetic datasets includes:
separating a given query plan of the plurality of query plans into a plurality of stages; and
generating a probability model that includes nodes representing two or more stages of the given query plan and edges between the nodes representing the probability of moving between the two or more stages during execution of the given query plan according to a subset of the canned statistics;
execute the plurality of query plans on the plurality of synthetic datasets; and
update the query optimizer based on results of executing the plurality of query plans on the plurality of synthetic datasets.

15. The system of claim 14, wherein the instructions are further executable by the at least one processor to:
select, via the updated query optimizer, one or more of the plurality of query plans for execution on the database; and
execute the selected one or more query plans to perform one or more database operations on the database.

16. The system of claim 14, wherein the subset of the canned statistics includes database statistics for respective stages of the plurality of stages of the given query plan.

17. The system of claim 16, wherein generating the given synthetic dataset includes generating a plurality of synthetic data tuples, and wherein generating the plurality of synthetic datasets is performed simultaneously using the given query plan and by adjusting the canned statistics when generating respective ones of the plurality of synthetic data tuples.

18. The system of claim 14, wherein generating the given synthetic dataset further includes:
performing a plurality of random walkthroughs of the probability model, wherein each walkthrough of the probability model produces a synthetic data tuple.

19. The system of claim 18, wherein the probability model is a Markov model, wherein the plurality of stages of the given query plan are assigned to different states of the Markov model, and wherein the canned statistics are used to determine transition probabilities between the different states.

20. The system of claim 14, wherein the instructions are further executable by the at least one processor to cause the system to:
generate, prior to receiving the request and using the query optimizer, the plurality of query plans for the database, wherein the generating is performed based on a plurality of historical requests to perform database operations on data stored in the database.

* * * * *